(12) United States Patent
Padmanabhan

(10) Patent No.: US 12,547,980 B2
(45) Date of Patent: Feb. 10, 2026

(54) SYSTEM OR METHOD OF VERIFYING AN ASSET USING BLOCKCHAIN AND COLLECTED ASSET AND DEVICE INFORMATION

(71) Applicant: Salesforce, Inc., San Francisco, CA (US)

(72) Inventor: Prithvi Krishnan Padmanabhan, San Ramon, CA (US)

(73) Assignee: Salesforce, Inc., San Francisco, CA (US)

(*) Notice: Subject to any disclaimer, the term of this patent is extended or adjusted under 35 U.S.C. 154(b) by 22 days.

(21) Appl. No.: 18/486,107

(22) Filed: Oct. 12, 2023

(65) Prior Publication Data

US 2024/0037503 A1 Feb. 1, 2024

Related U.S. Application Data

(62) Division of application No. 16/714,623, filed on Dec. 13, 2019, now Pat. No. 11,823,120.

(51) Int. Cl.
*G06Q 10/087* (2023.01)
*H04L 9/06* (2006.01)
*H04W 4/35* (2018.01)

(52) U.S. Cl.
CPC ......... *G06Q 10/087* (2013.01); *H04L 9/0637* (2013.01); *H04W 4/35* (2018.02)

(58) Field of Classification Search
None
See application file for complete search history.

(56) References Cited

U.S. PATENT DOCUMENTS

| | | |
|---|---|---|
| 7,730,478 B2 | 6/2010 | Weissman |
| 10,585,657 B2 | 3/2020 | Padmanabhan |
| 10,701,054 B2 | 6/2020 | Padmanabhan et al. |
| 11,030,188 B2 | 6/2021 | Lu et al. |
| 11,133,936 B1 | 9/2021 | Branton |
| 11,200,546 B1 | 12/2021 | Fisher |
| 11,232,439 B2 | 1/2022 | Westland |
| 11,582,042 B2 * | 2/2023 | Beckmann ............ H04L 9/3239 |

(Continued)

FOREIGN PATENT DOCUMENTS

| | | |
|---|---|---|
| CN | 106779737 A | 5/2017 |
| CN | 108171601 A | 6/2018 |

(Continued)

OTHER PUBLICATIONS

Intention to Grant, EP App. No. 20825003.5, Jul. 4, 2024, 6 pages.

(Continued)

*Primary Examiner* — Fateh M Obaid
(74) *Attorney, Agent, or Firm* — Nicholson De Vos Webster & Elliott LLP

(57) ABSTRACT

A method of asset verification implemented by a computing device as part of an asset verification system. The asset verification utilizes unique identifying information of the asset. The method collects asset information from a user, collects asset information from the computing device, generates a unique identifier from the asset information, adds the unique identifier and the asset information to a blockchain, and stores the asset information in a distributed storage system.

14 Claims, 12 Drawing Sheets

(56) References Cited

U.S. PATENT DOCUMENTS

| | | |
|---|---|---|
| 2016/0072831 A1 | 3/2016 | Rieke |
| 2016/0098730 A1 | 4/2016 | Feeney |
| 2016/0292396 A1 | 10/2016 | Akerwall |
| 2016/0330034 A1 | 11/2016 | Back et al. |
| 2017/0004526 A1 | 1/2017 | Morovati et al. |
| 2017/0083561 A1 | 3/2017 | Bump et al. |
| 2017/0232300 A1 | 8/2017 | Tran et al. |
| 2018/0012311 A1 | 1/2018 | Van Oss et al. |
| 2018/0078843 A1 | 3/2018 | Tran et al. |
| 2018/0117446 A1 | 5/2018 | Tran et al. |
| 2018/0117447 A1 | 5/2018 | Tran et al. |
| 2018/0264347 A1 | 9/2018 | Tran et al. |
| 2018/0343126 A1 | 11/2018 | Fallah et al. |
| 2019/0044727 A1 | 2/2019 | Scott et al. |
| 2019/0236559 A1 | 8/2019 | Padmanabhan |
| 2019/0236562 A1 | 8/2019 | Padmanabhan |
| 2019/0236598 A1 | 8/2019 | Padmanabhan |
| 2019/0236606 A1 | 8/2019 | Padmanabhan et al. |
| 2019/0238316 A1 | 8/2019 | Padmanabhan |
| 2019/0238525 A1 | 8/2019 | Padmanabhan et al. |
| 2019/0251076 A1* | 8/2019 | Yan ............... G06F 16/2365 |
| 2019/0251489 A1* | 8/2019 | Berti ............... G06Q 10/0631 |
| 2019/0251576 A1* | 8/2019 | Saab ............... H04L 9/0637 |
| 2019/0253256 A1 | 8/2019 | Saab et al. |
| 2019/0279204 A1* | 9/2019 | Norton ............... G06Q 10/08 |
| 2019/0288847 A1* | 9/2019 | Beckmann ......... G06F 16/2246 |
| 2019/0303445 A1 | 10/2019 | Padmanabhan |
| 2019/0317935 A1* | 10/2019 | Berti ............... G06F 16/27 |
| 2019/0334723 A1 | 10/2019 | Endress et al. |
| 2019/0361917 A1 | 11/2019 | Tran et al. |
| 2019/0377806 A1 | 12/2019 | Padmanabhan et al. |
| 2020/0042939 A1 | 2/2020 | Padmanabhan |
| 2020/0044824 A1* | 2/2020 | Xie ............... G06Q 20/10 |
| 2020/0089663 A1 | 3/2020 | Padmanabhan |
| 2020/0089670 A1 | 3/2020 | Padmanabhan et al. |
| 2020/0089671 A1 | 3/2020 | Padmanabhan et al. |
| 2020/0089672 A1 | 3/2020 | Velisetti et al. |
| 2020/0133955 A1 | 4/2020 | Padmanabhan et al. |
| 2020/0134656 A1 | 4/2020 | Padmanabhan |
| 2020/0137090 A1* | 4/2020 | Holzhauer ......... H04L 63/1416 |
| 2020/0169546 A1 | 5/2020 | Padmanabhan |
| 2020/0250174 A1 | 8/2020 | Padmanabhan et al. |
| 2020/0250176 A1 | 8/2020 | Padmanabhan |
| 2020/0250177 A1 | 8/2020 | Padmanabhan |
| 2020/0250295 A1 | 8/2020 | Padmanabhan |
| 2020/0250661 A1 | 8/2020 | Padmanabhan et al. |
| 2020/0250683 A1 | 8/2020 | Padmanabhan et al. |
| 2020/0250747 A1 | 8/2020 | Padmanabhan |
| 2020/0252205 A1 | 8/2020 | Padmanabhan |
| 2020/0252404 A1 | 8/2020 | Padmanabhan |
| 2020/0252406 A1 | 8/2020 | Padmanabhan et al. |
| 2020/0287718 A1 | 9/2020 | Hildebrand et al. |
| 2020/0287719 A1 | 9/2020 | Hildebrand et al. |
| 2020/0344132 A1 | 10/2020 | Padmanabhan |
| 2020/0349142 A1 | 11/2020 | Padmanabhan |
| 2020/0349564 A1 | 11/2020 | Padmanabhan et al. |
| 2020/0374105 A1 | 11/2020 | Padmanabhan |
| 2021/0004924 A1 | 1/2021 | Sims et al. |
| 2021/0304155 A1* | 9/2021 | Blackburn ......... G06Q 10/0875 |

FOREIGN PATENT DOCUMENTS

| | | |
|---|---|---|
| CN | 109191003 A | 1/2019 |
| CN | 109906443 A | 6/2019 |
| JP | 2019-511758 A | 4/2019 |
| WO | 2019/177764 A1 | 9/2019 |

OTHER PUBLICATIONS

Notice of Allowance, JP App. No. 2022-535053, Jan. 9, 2024, 05 pages (2 pages of English Translation and 3 pages of Original Document).

Advisory Action, U.S. Appl. No. 16/714,623, Nov. 1, 2021, 3 pages.

Easy There Entropy Blog, "Understanding the ethereum trie," Jun. 4, 2014, downloaded from https://easythereentropy.wordpress.com/2014/06/04/understanding-the-ethereum-trie/ on Jul. 1, 2022, 7 pages.

Ethereum Stack Exchange, "ELI5 How does a Merkle-Patricia-trie tree work?" Blockchain, Jun. 22, 2016, 5 pages.

Final Office Action, U.S. Appl. No. 16/714,623, Apr. 1, 2022, 9 pages.

Final Office Action, U.S. Appl. No. 16/714,623, Jul. 22, 2021, 8 pages.

International Preliminary Report on Patentability, PCT App. No. PCT/IB2020/061718, Jun. 23, 2022. 10 pages.

International Search Report and Written Opinion, PCT App. No. PCT/IB2020/061718, Feb. 22, 2021, 14 pages.

Non-Final Office Action, U.S. Appl. No. 16/714,623, Nov. 24, 2021, 8 pages.

Non-Final Office Action, U.S. Appl. No. 16/714,623, Mar. 16, 2023, 8 pages.

Non-Final Office Action, U.S. Appl. No. 16/714,623, Jan. 22, 2021, 5 pages.

Notice of Allowance, U.S. Appl. No. 16/714,623, Jul. 14, 2023, 9 pages.

Office Action, JP App. No. 2022-535053, Jul. 6, 2023, 39 pages (21 pages of English Translation and 18 pages of Original Document).

Requirement for Restriction/Election, U.S. Appl. No. 16/714,623, Sep. 15, 2022, 6 pages.

Second Office Action, CN App. No. 202080055477.3, Jun. 13, 2025, 15 pages (09 pages of English Translation and 06 pages of Original Document).

Office Action, CN App. No. 202080055477.3, Aug. 20, 2025, 16 pages (08 pages of English Translation and 08 pages of Original Document).

Office Action, CN App. No. 202080055477.3, Jan. 24, 2025, 16 pages (08 pages of English Translation and 08 pages of Original Document).

* cited by examiner

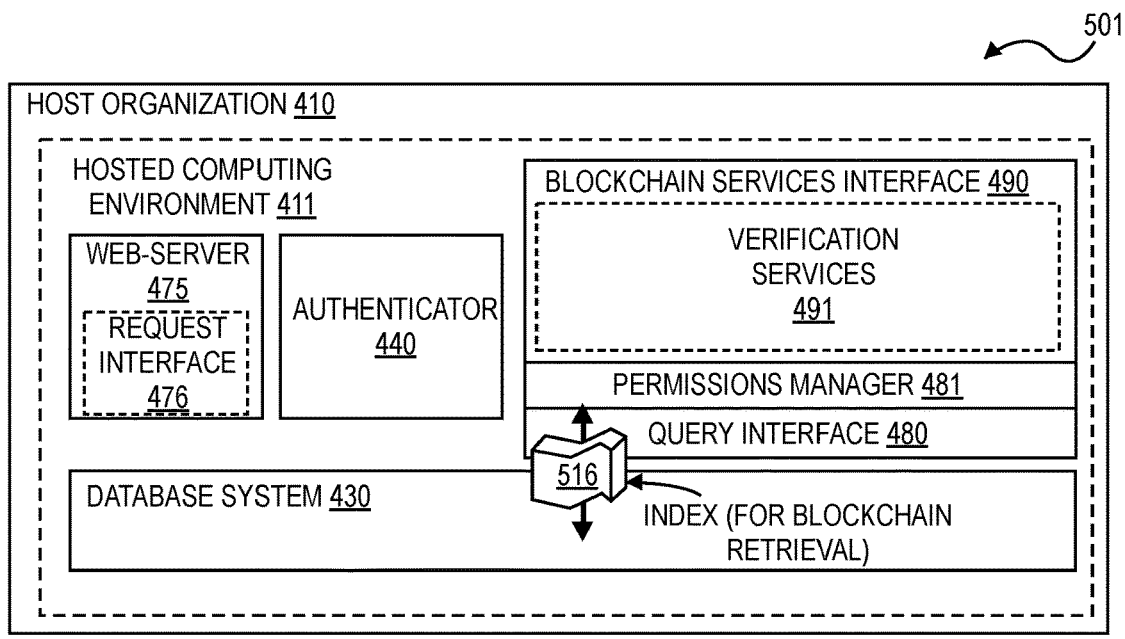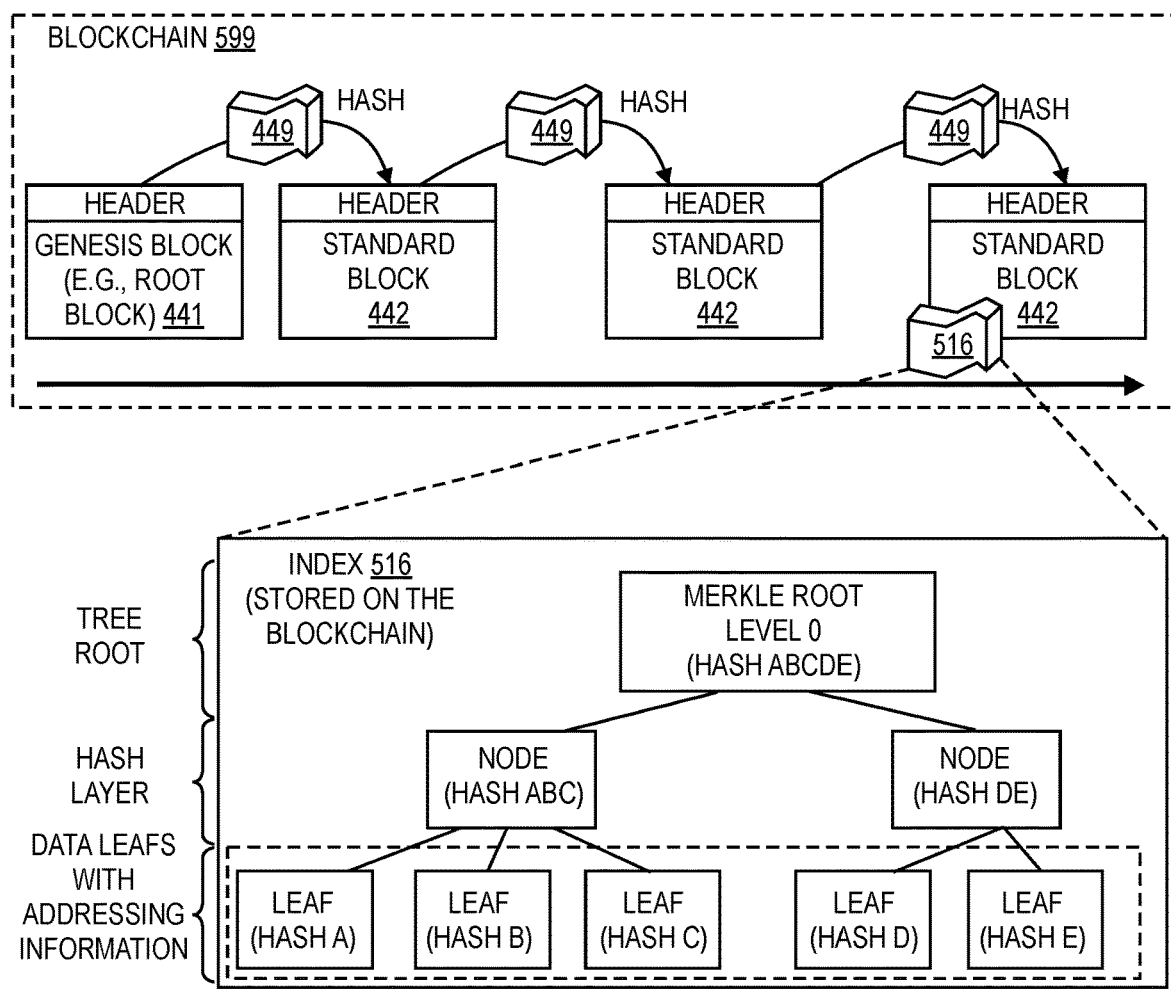
FIG. 5

SYSTEM OR METHOD OF VERIFYING AN ASSET USING BLOCKCHAIN AND COLLECTED ASSET AND DEVICE INFORMATION

CROSS-REFERENCE TO RELATED APPLICATIONS

This application is a divisional of U.S. application Ser. No. 16/714,623, filed Dec. 13, 2019, which is hereby incorporated by reference.

TECHNICAL FIELD

One or more implementations relate to the field of distributed ledgers and blockchain platforms; and more specifically, the embodiments relate to systems, methods, and apparatuses for implementing asset verification and validation with related information stored in the blockchain.

BACKGROUND ART

A blockchain is a continuously expanding list of records/blocks that are linked and secured using cryptography. In particular, every block in a blockchain may include a cryptographic hash of the immediately preceding block, a timestamp for the current block, and transaction data (e.g., the addition/modification of information associated with a peer in a blockchain network). Further, the blockchain may be shared and managed through a peer-to-peer network via a system of verifying/validating new blocks to be added to the chain such that a block in a blockchain cannot be altered without alteration of all subsequent blocks, which requires network consensus. This architecture allows for security of information stored within blocks through the use of cryptography; sharing/distribution of information through the use of peer-to-peer networks; trust through the use of consensus of block addition; and immutability of information stored within blocks through the use of cryptography, chaining/linking of blocks, and peer distribution (e.g., each peer in the blockchain network may maintain a ledger of all verified/validated transactions in the network). Blockchains can be utilized to store many different types of data including financial data. Such financial data can be stored in a blockchain that functions as a distributed ledger.

A distributed ledger in blockchain is shared by all of the participants in that blockchain. Distributed Ledger Technology (DLT) helps to address and overcome many of the types of shortcomings of conventional financial systems, however, the technology may nevertheless be expanded to introduce even further benefits to those utilizing such DLT and related blockchain platforms.

Counterfeiting is the production of goods including retail (e.g., clothing, electronics, and other consumer goods) and digital (e.g., software, digital media, and similar digital content) without authorization from the intellectual property owners for such goods (e.g., the trademark, patent or copyright holders). Counterfeiting cost rights holders billions of dollars globally each year. Measures to combat counterfeiting in certain markets and for certain types of goods is ineffective.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

FIG. 5 is a diagram of another example architecture according to some example implementations.

DETAILED DESCRIPTION

Figure 1:
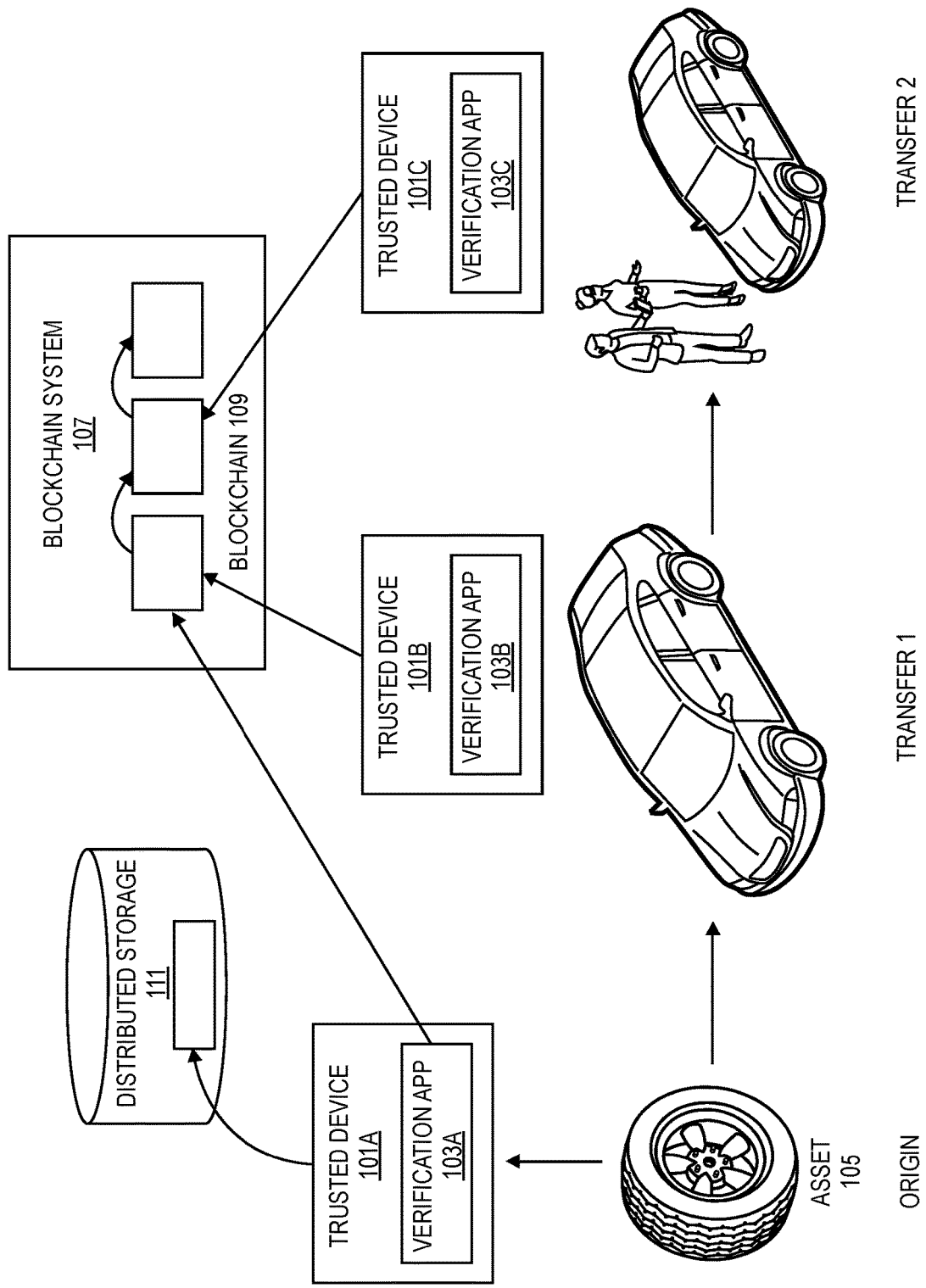
FIG. 1 is a diagram of an example supply chain including verification management according to some example implementations.

The following description describes methods and apparatus for a verification process, system and apparatus to combat counterfeiting. The verification system collects information about a product at the point of manufacture or installation and stores the data in the blockchain. The product can be verified at other points a supply chain or at a next sale by a trusted device that collects a subset of the initially collected information and verifies the information correlates with the information stored in the blockchain.

The embodiments of the verification system include a set of trusted devices, verification applications, and blockchain storage. A 'set,' as used herein refers to any whole number of items including one item. The information stored for each asset include factors that were used when generating an identity of the asset along with a combination of blockchain, the blockchain network and verification system information. A verification application is executed by a trusted device at the point of origin for an asset, such as at a seller, developer, manufacturer or part installer. When an asset is sold or transferred to a consumer e.g. a car part is installed, the verification application on the trusted device can generate a unique identifier based on a set of information that can include an identifier of the trusted device, imaging information such as saturation, depth and hue of the light, date, time, temperature, part or asset identifiers, product stock keeping unit (SKU) and similar information. This unique identifier for the asset is then stored in a set of blocks in a blockchain for that consumer (customer) along with the information with which the unique identifier was generated. This information to be stored in the blockchain can be hashed and encrypted. Only the trusted devices that have been registered for the verification system and for a particular participant can perform this blockchain addition. In some implementations, a smart contract in the blockchain will reject the transaction if unauthorized devices and participants attempt to add transactions to the blockchain. In other words, the verification system will not allow unauthorized devices with verification applications or unauthorized users to generate this information. Only the authorized trusted devices can add asset information to the blockchain. In some implementations, the asset related data is structured in a merkle trie tree in the blockchain such that it follows a format such as consumer id(hash)+location(hash)+part_sku(hash) and then other parameters are stored in the merkle trie tree under this data, where the lower hierarchy data is the input data used to generated the unique identifier for the asset.

In some implementations, the verification applications and trusted devise will take an image of the asset and upload the unique hash for the picture in the blockchain (e.g., as part of the merkle trie tree) and post the image to a distributed store.

A verification application is also utilized at trusted devices when there are further sales or transfers of the asset. The verification application utilized for resales or transfers can be the same or similar to the verification application utilized at the point of origin. However, the verification application will function differently for the resale or transfer. The verification application for resale or transfer of an assets collect some information from the transferor and the transferee. The verification application can also collect information (e.g., by imaging) about the asset. Based on the information that is collected by the verification application, the verification application can search the merkle trie tree along with the SKU information and location information. If there is a match found in the blockchain for the collected information, then the verifier can access protected or encrypted information about the asset including information about the participant who added the asset to the blockchain. The verification application can additionally request to access the image of installation or origination to be displayed for comparison. In some implementations, during the verification process, the transferor and the transferee are not shared or stored to provide privacy. The date and time information related to transfers of assets can be used to verify if the temperature and similar factors were the same as that which was recorded. The verification application can base verification of an asset by examining the depth of information in the merkle trie tree and correlating collected information with the depth of similar information as recorded in the merkle trie tree when the unique identifier was generated. The verification application can use other parameters in the blockchain to regenerate the unique identifier (e.g., using a hashing algorithm). If the regenerated unique identifier is matched to the true original unique identifier, then the asset is verified. If the unique identifiers do not match, then in some implementations, a notification can be sent to the participant that is indicated as the last transferee or the originator to verify the information related to the current transfer.

The verification system is a permissioned system where devices must be registered with the verification system to be enabled to access the information stored in the associated blockchain as well as add to or modify the information therein. The devices can be registered with the verification system using any process to verify that the devices are approved to access and interact with the verification system. The trusted devices can include hardware or software protections to prevent tampering and spoofing of the trusted devices. In addition, users and the verification applications can also be verified or authenticated before being given permission to utilize the trusted device or interact with the verification system. Any process for verification or authentication of users and the verification application can be utilized.

The embodiments are described in further detail herein below with reference to the figures.

FIG. 1 is a diagram of one example implementation of a verification system. In the example, the verification system is utilized to track and verify the authenticity of an example set of assets. In this example, automotive parts are track, in particular an asset 105 that is a tire. The origin of the asset 105 in this example can be at a tire manufacturer. At the place of origin, where the place of origin participates in the verification system, a trusted device 101A can execute a verification application 103A. The verification application 103A can collect information about the asset 105 by imaging or similar sensor input as well as via information collected from an authenticated user (i.e., a user who has an account and has verified credentials such as a password or similar method of authentication). In some implementations, the collected information can be obtained from services accessible over a network, for example, obtaining weather, time, and date information from a weather service or time source. The verification application 103A creates an entry in a blockchain 109 of the verification system in a blockchain system 107 that is part of the verification system. A set of blocks can be added for the asset including information that is collected by the verification application 103A. The verification application 103A can generate a unique identifier that is encrypted and stored in the blockchain 109 for the asset 105. Other collected data can be stored in either an encrypted or unencrypted form and associated with the unique identifier, e.g., in a format of a merkle trie tree. Some collected data such as imaging of the asset or similar information that takes up considerable space can be stored in a distributed storage system 111. The distributed storage system 111 can include any number of storage locations that are accessible via the verification system via network communications. The data being stored in the distributed storage system 111 can be processed to generate a unique identifier, which in turn can be associated with a storage location to enable retrieval of the data.

After the asset 105 is added to the blockchain 109, then subsequent transfers of the asset 105 can be verified. In the example, the tire is sold to a car manufacturer and installed on a car. The car manufacturer can verify that the tire is authentic via a trusted device 101B and verification application 103B. The authenticated user of the verification application 103B collects information about the asset 105 that is compared to the information stored in the blockchain 109 and the unique identifier is regenerated for comparison. If the asset 105 is verified, then the transaction is added to the blockchain 109 including information collected during the transaction related to the asset 105. This information can then be used for comparison in subsequent transfers of the asset 105, for example in transfer 2 where trusted device 101C and verification application 103C are attempting to verify the asset 105 in a case where the car with the tire is sold to a customer.

Figure 2:
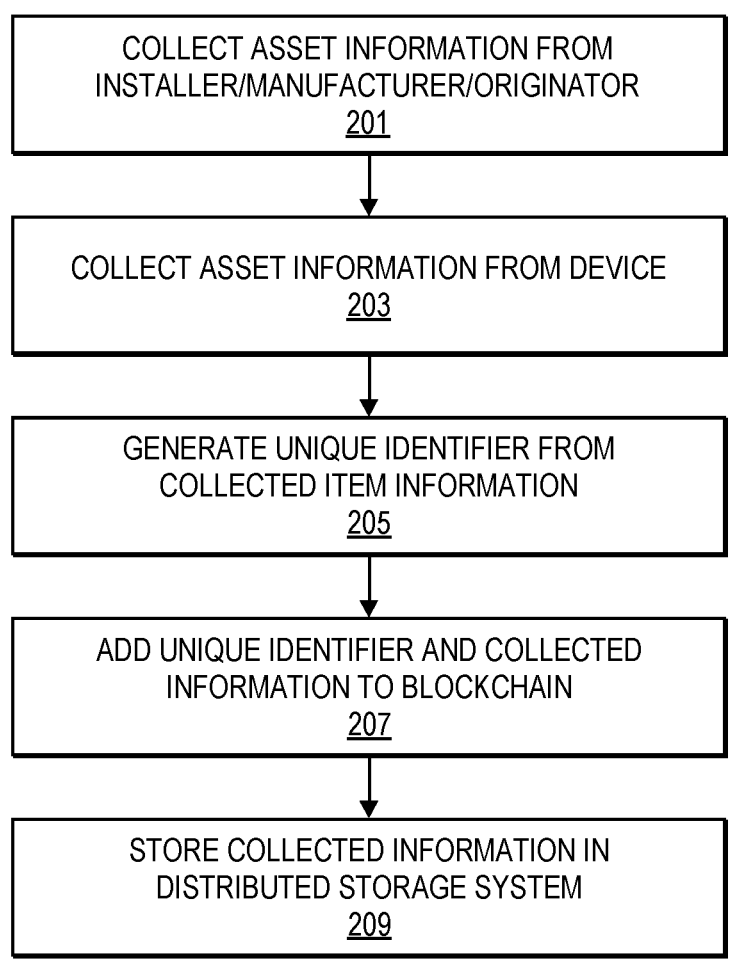
FIG. 2 is a flowchart of an example process implemented by an installer or manufacturer as part of the verification management system according to some example implementations.

FIG. 2 is a flowchart of an example process implemented by an installer, manufacturer or originator as part of the verification management system according to some example implementations. This process is executed by a verification application at the point of origin for an asset. The process is initiated by an authenticated user via the verification application. The authenticated user inputs information about the asset into the verification application. The input information can include description, identifiers (e.g., serial or part numbers and/or SKU), imaging, originator information, location and similar information related to the asset (Block 201). Originator information can include government identifiers for an individual or business, credit card information, bank information, and similar information. Some types of collected information such as imaging can be analyzed for additional details by the verification application. For example, the lighting, hue, gradients, and similar imaging information can be analyzed and collected.

Additional information can be collected by the verification application from the trusted device or from external sources (Block 203). The collected information from the device can include device identification information (e.g., mac address or similar identifiers). Date, time, and similar information can be collected from the device. Global positioning information can be collected from the device. Weather information such as temperature, humidity, and similar data can be collected from the device or from online sources for a location of the device. Any number and combination of data points can be collected related to the asset and the origination of the asset. In some implementations, collected information can include radio frequency identifier (RFID), near field communication (NFC) identification information, infrared (IR) marks such as spray marks, and similar identification information that may be attached, embedded, or similarly part of the asset. These additional identifiers can be utilized in place of or in combination of other identification information including SKUs, serial numbers, and part numbers.

The collected information or any subset thereof can be used to generate a unique identifier, for example using a hashing algorithm over the subset of the collected data (Block 205). In one implementation, the unique identifier can be consumer id(hash)+location(hash)+part_sku(hash). The unique identifier and any subset of the collected information can then be added by the verification application to a blockchain for the verification system (Block 207). The unique identifier can be encrypted and stored in the blockchain. The additional information, in particular the information used to generate the unique identifier can be stored encrypted or in the clear in the blockchain along with the unique identifier. The additional information can be stored in the form of a merkle trie tree. The format of the merkle trie tree enables partial hashes to be generated using information stored in the lower levels of the merkle trie tree that can enable partial matches with the unique identifier.

Additional information that cannot be easily stored in the blockchain can be stored in distributed storage locations (Block 209). Any type of distributed storage system can be utilized to store the additional information such as images of the asset or similar data that takes up significant space. Three dimensional scans, video, computer aided design (CAD) drawings or schematics and similar information can be stored in this manner. A link or similar location information can be stored in the blockchain to locate the data stored in a distributed storage system. In some implementations, each item stored in the distributed storage system can have a unique identifier generated similar to the unique identifier for the asset, which is stored along with location information in the blockchain.

Figure 3:
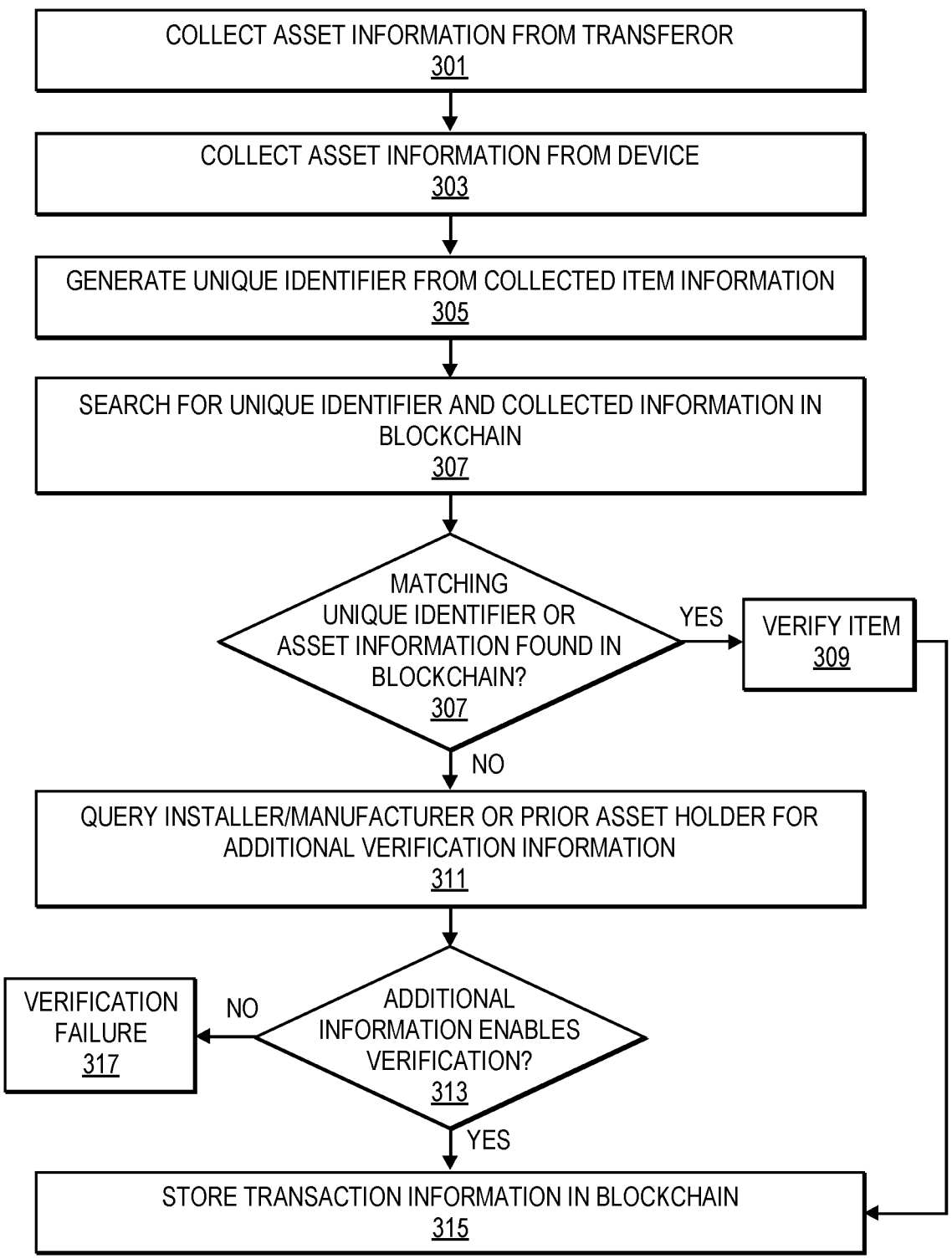
FIG. 3 is a flowchart of an example process implemented by a verifier as part of the verification management system according to some example implementations.

FIG. 3 is a flowchart of an example process implemented by a verifier as part of the verification management system according to some example implementations.

This process is executed by a verification application at the point of transfer for an asset. The process is initiated by an authenticated user via the verification application. The authenticated user inputs information about the asset into the verification application. The input information can include description, identifiers (e.g., serial or part numbers and/or SKU), imaging, transferor and transferee information, location and similar information related to the asset (Block 301). Transferor and transferee information can include government identifiers for an individual or business, credit card information, bank information, and similar information. Some types of collected information such as imaging can be analyzed for additional details by the verification application. For example, the lighting, hue, gradients, and similar imaging information can be analyzed and collected.

Additional information can be collected by the verification application from the trusted device or from external sources (Block 303). The collected information from the device can include device identification information (e.g., mac address or similar identifiers). Date, time, and similar information can be collected from the device. Global positioning information can be collected from the device. Weather information such as temperature, humidity, and similar data can be collected from the device or from online sources for a location of the device. This information that is collected can be related to the prior transfer or origin and/or the current transfer. Any number and combination of data points can be collected related to the asset and the origination and/or the transfer of the asset.

The collected information or any subset thereof can be used to generate a unique identifier, for example using a hashing algorithm over the subset of the collected data (Block 305). The same algorithm or process for generating a unique identifier is used on verification as used in origination or prior transfers. The unique identifier and any subset of the collected information can then be used to search in the blockchain for matching information and unique identifier (Block 307). The verification system can enable the stored unique identifier to be decrypted for comparison in the blockchain. The additional information, in particular the information used to generate the unique identifier can be also be decrypted if necessary or if in the clear in the blockchain can be compared along with the unique identifier. A match of the unique identifier and the additional information can be less than a complete match due to the properties of the data stored in the merkle trie tree. The verification system can be configured to determine verification where the degree of the match exceeds a configured threshold. In such cases, the asset is considered verified (Block 309).

If however, the collected information and generated unique identifier do not meet the threshold, then additional information can be requested from the transferor or originator of the asset (Block 307). This can be in the form of querying electronically a transferor identified by the information in the blockchain or by querying via the verification application the user to input more information. Any of the collected data points can be queried and compared with different data points having different weighting in some implementations. If additional information cannot be collected, or the additional information does not enable the match to exceed the configured threshold, then the verification process is designated a failure (Block 317), in this case the asset is not verified and the verification system will not record a further transaction. If the asset is verified, then the transaction information will be stored in the blockchain to indicate that the asset has transferred from a transferor to a transferee, this additional transaction data will be utilized for future verification in the event of additional transfers of the asset (Block 315). As with originating transaction, if there is any additional information that cannot be easily stored in the blockchain, then it can be stored in distributed storage locations.

Figure 4:
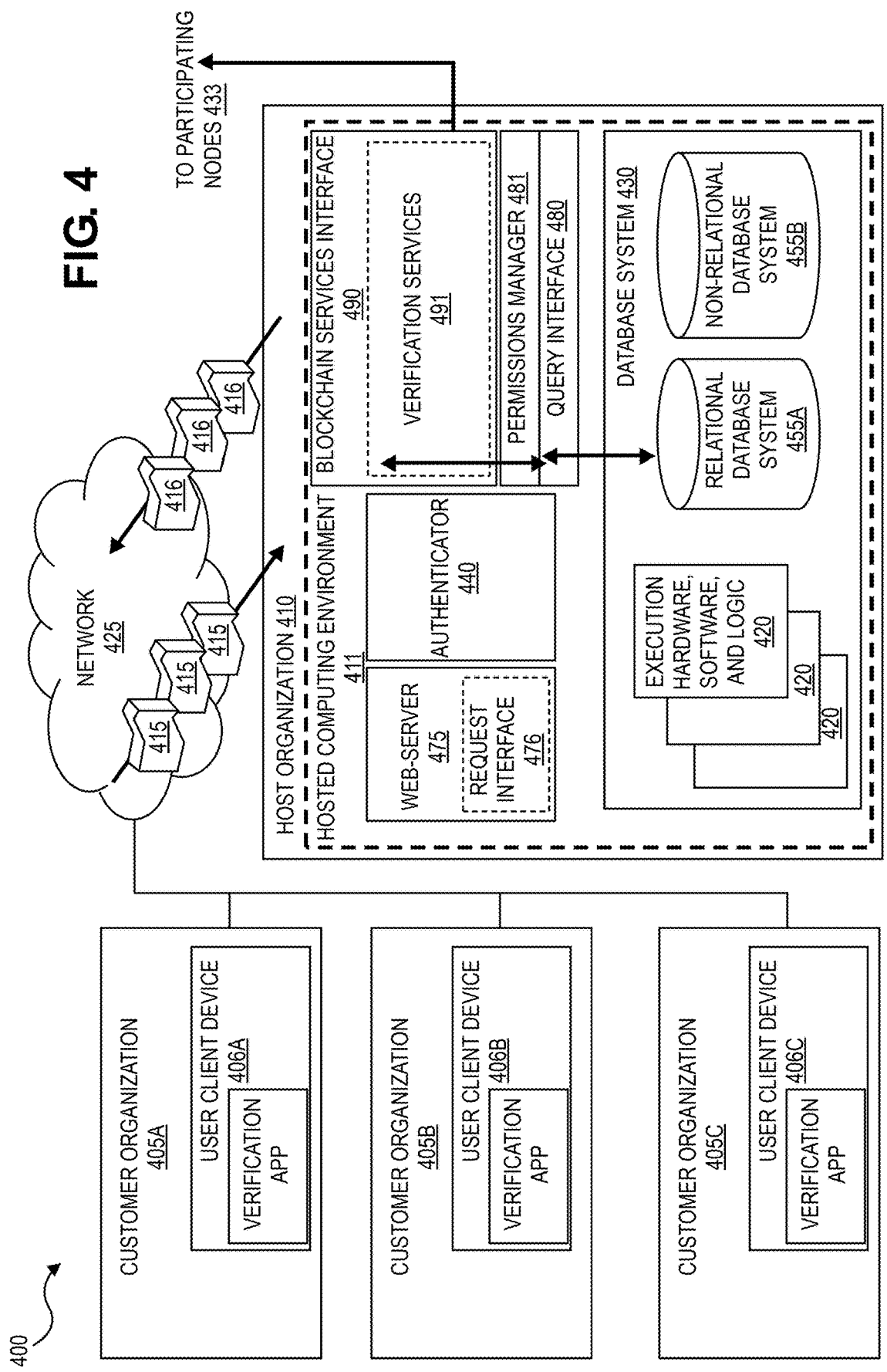
FIG. 4 is a diagram of an example architecture according to some example implementations.

FIG. 4 is a diagram of an example architecture according to some example implementations. In one example implementation, a hosted computing environment 411 is communicably interfaced with a plurality of user client devices 406A-C (e.g., such as mobile devices, smart phones, tablets, PCs, etc.) through host organization 410. A database system 430 includes databases 455A and 455B, for example, to store application code, object data, tables, datasets, and underlying database records including user data on behalf of customer organizations 405A-C (e.g., users of such a database system 430 or tenants of a multi-tenant database type database system or the affiliated users of such a database system). Such databases include various database system types including, for example, a relational database system 455A and a non-relational database system 455B according to certain embodiments.

In certain embodiments, a client-server computing architecture may be utilized to supplement features, functionality, or computing resources for the database system 430 or alternatively, a computing grid, or a pool of work servers, or some combination of hosted computing architectures may provide some or all of computational workload and processing demanded of the host organization 410 in conjunction with the database system 430.

The database system 430 depicted in the embodiment shown includes a plurality of underlying hardware, software, and logic elements 420 that implement database functionality and a code execution environment within the host organization 410.

In accordance with one embodiment, database system 430 utilizes the underlying database system implementations 455A and 455B to service database queries and other data interactions with the database system 430 that communicate with the database system 430 via the query interface 480. The hardware, software, and logic elements 420 of the database system 430 are separate and distinct from the customer organizations (405A, 405B, and 405C) which utilize web services and other service offerings as provided by the host organization 410 by communicably interfacing to the host organization 410 via network 425. In such a way, host organization 410 may implement on-demand services, on-demand database services or cloud computing services to subscribing customer organizations 405A-C.

In one implementation, each customer organization 405A-C is an entity selected from the group consisting of: a separate and distinct remote organization, an organizational group within the host organization 410, a business partner of the host organization 410, or a customer organization 405A-C that subscribes to cloud computing services provided by the host organization 410.

Further depicted is the host organization 410 receiving input and other requests 415 from customer organizations 405A-C via network 425 (e.g., a public network, the Internet, or similar network). For example, incoming search queries, database queries, API requests, interactions with displayed graphical user interfaces and displays at the user client devices 406A-C, or other inputs may be received from the customer organizations 405A-C to be processed against the database system 430, or such queries may be constructed from the inputs and other requests 415 for execution against the databases 455 or the query interface 480, pursuant to which results 416 are then returned to an originator or requestor, such as a user of one of a user client device 406A-C at a customer organization 405A-C.

In one implementation, requests 415 are received at, or submitted to, a web-server 475 within host organization 410. Host organization 410 may receive a variety of requests for processing by the host organization 410 and its database system 430. Incoming requests 415 received at web-server 475 may specify which services from the host organization 410 are to be provided, such as query requests, search request, status requests, database transactions, graphical user interface requests and interactions, processing requests to retrieve, update, or store data on behalf of one of the customer organizations 405A-C, code execution requests, and so forth. Web-server 475 may be responsible for receiving requests 415 from various customer organizations 405A-C via network 425 on behalf of the query interface 480 and for providing a web-based interface or other graphical displays to an end-user user client device 406A-C or machine originating such data requests 415.

Certain requests 415 received at the host organization may be directed toward a blockchain for which the blockchain services interface 490 of the host organization 410 operates as an intermediary.

The query interface 480 is capable of receiving and executing requested queries against the databases and storage components of the database system 430 and returning a result set, response, or other requested data in furtherance of the methodologies described. The query interface 480 additionally provides functionality to pass queries from web-server 475 into the database system 430 for execution against the databases 455 for processing search queries, or into the other available data stores of the host organization's computing environment 411. In one embodiment, the query interface 480 implements an Application Programming Interface (API) through which queries may be executed against the databases 455 or the other data stores. Additionally, the query interface 480 provides interoperability with the blockchain services interface 490, thus permitting the host organization 410 to conduct transactions with either the database system 430 via the query interface 480 or to transact blockchain transactions onto a connected blockchain for which the host organization 410 is a participating node or is in communication with the participating nodes 433, or the host organization 410 may conduct transactions involving both data persisted by the database system 430 (accessible via the query interface 480) and involving data persisted by a connected blockchain (e.g., accessible from a participating node 433 or from a connected blockchain directly, where the host organization operates a participating node on such a blockchain).

In certain embodiments, the Application Programming Interface (API) of the query interface 480 provides an API model through which programmers, developers, and administrators may interact with the blockchain services interface 490 or the database system 430, or both, as the needs and particular requirements of the API caller dictate.

Host organization 410 may implement a request interface 476 via web-server 475 or as a stand-alone interface to receive requests packets or other requests 415 from the user client devices 406A-C. Request interface 476 further supports the return of response packets or other replies and responses 1D16 in an outgoing direction from host organization 410 to the user client devices 406A-C. Authenticator 440 operates on behalf of the host organization to verify, authenticate, and otherwise credential users attempting to gain access to the host organization as well as resources and services hosted by the host organization 410 such as the verification system.

Further depicted within host organization 410 is the blockchain services interface 490 having included therein both a blockchain consensus manager which facilitates consensus management for private and public blockchains upon which tenants, customer organizations, or the host organization itself 410 operate as a participating node on a supported blockchain. Additionally, depicted is the verification services 491, which enables the verification processes described herein above in combination with verification applications implemented by the user client devices 406A-C. In this manner, the verification services 491 and verification applications work in conjunction to implement the verification system functions describe further herein with reference to FIGS. 1-3.

As shown here, the blockchain services interface 490 communicatively interfaces the host organization 410 with other participating nodes 433 (e.g., via the network 425) so as to enable the host organization 410 to participate in available blockchain protocols by acting as a blockchain protocol compliant node, which in turn, permits the host organization 410 to access information within such a blockchain as well as enabling the host organization 410 to provide blockchain services to other participating nodes 433 for any number of blockchain protocols supported by, and offered to customers and subscribers by the host organization 410. In certain embodiments, the host organization 410 both provides the blockchain protocol upon which the host organization then also operates as participating node. In other embodiments, the host organization merely operates as a participating node so as to enable the host organization 410 to interact with the blockchain protocol(s) provided by others.

A blockchain is a continuously growing list of records, grouped in blocks, which are linked together and secured using cryptography. Each block typically contains a hash pointer as a link to a previous block, a timestamp and transaction data. By design, blockchains are inherently resistant to modification of the data. A blockchain system essentially is an open, distributed ledger that records transactions between two parties in an efficient and verifiable manner, which is also immutable and permanent. A distributed ledger (also called a shared or common ledger, or referred to as distributed ledger technology (DLT)) is a consensus of replicated, shared, and synchronized digital data geographically spread across multiple nodes. The nodes may be located in different sites, countries, institutions, user communities, customer organizations, host organizations, hosted computing environments, or application servers. There is no central administrator or centralized data storage.

Blockchain systems use a peer-to-peer (P2P) network of nodes, and consensus algorithms ensure replication of digital data across nodes. A blockchain system may be either public or private. Not all distributed ledgers necessarily employ a chain of blocks to successfully provide secure and valid achievement of distributed consensus: a blockchain is only one type of data structure considered to be a distributed ledger.

P2P computing or networking is a distributed application architecture that partitions tasks or workloads between peers. Peers are equally privileged, equally capable participants in an application that forms a peer-to-peer network of nodes. Peers make a portion of their resources, such as processing power, disk storage or network bandwidth, directly available to other network participants, without the need for central coordination by servers or hosts. Peers are both suppliers and consumers of resources, in contrast to the traditional client-server model in which the consumption and supply of resources is divided. A peer-to-peer network is thus designed around the notion of equal peer nodes simultaneously functioning as both clients and servers to the other nodes on the network.

For use as a distributed ledger, a blockchain is typically managed by a peer-to-peer network collectively adhering to a protocol for validating new blocks. Once recorded, the data in any given block cannot be altered retroactively without the alteration of all subsequent blocks, which requires collusion of the network majority. In this manner, blockchains are secure by design and are an example of a distributed computing system with high Byzantine fault tolerance. Decentralized consensus has therefore been achieved with a blockchain. This makes blockchains suitable for the recording of events, medical records, insurance records, and other records management activities, such as identity management, transaction processing, documenting provenance, or voting.

A blockchain database is managed autonomously using a peer-to-peer network and a distributed timestamping server. Records, in the form of blocks, are authenticated in the blockchain by collaboration among the nodes, motivated by collective self-interests. As a result, participants' uncertainty regarding data security is minimized. The use of a blockchain removes the characteristic of reproducibility of a digital asset. It confirms that each unit of value, e.g., an asset, was transferred only once, solving the problem of double spending.

Blocks in a blockchain each hold batches ("blocks") of valid transactions that are hashed and encoded into a Merkle tree. Each block includes the hash of the prior block in the blockchain, linking the two. The linked blocks form a chain. This iterative process confirms the integrity of the previous block, all the way back to the first block in the chain, sometimes called a genesis block or a root block.

By storing data across its network, the blockchain eliminates the risks that come with data being held centrally and controlled by a single authority. Although the host organization 410 provides a wide array of data processing and storage services, including the capability of providing vast amounts of data with a single responsible agent, such as the host organization 410, blockchain services differ insomuch that the host organization 410 is not a single authority for such services, but rather, via the blockchain services interface 490, is one of many nodes for an available blockchain protocol or operates as blockchain protocol manager and provider, while other participating nodes 433 communicating with the host organization 410 via blockchain services interface 490 collectively operate as the repository for the information stored within a blockchain by implementing compliant distributed ledger technology (DLT) in accordance with the available blockchain protocol offered by the host organization 410.

The decentralized blockchain may use ad-hoc message passing and distributed networking. The blockchain network lacks centralized points of vulnerability that computer hackers may exploit. Likewise, it has no central point of failure. Blockchain security methods include the use of public-key cryptography. A public key is an address on the blockchain. Value tokens sent across the network are recorded as belonging to that address. A private key is like a password that gives its owner access to their digital assets or the means to otherwise interact with the various capabilities that blockchains support. Data stored on the blockchain is generally considered incorruptible. This is where blockchain has its advantage. While centralized data is more controllable, information and data manipulation are common. By decentralizing such data, blockchain makes data transparent to everyone involved.

Every participating node 433 for a particular blockchain protocol within a decentralized system has a copy of the blockchain for that specific blockchain protocol. Data quality is maintained by massive database replication and computational trust. No centralized official copy of the database exists and, by default, no user and none of the participating nodes 433 are trusted more than any other, although this default may be altered via certain specialized blockchain protocols as will be described in greater detail below. Blockchain transactions are broadcast to the network using software, via which any participating node 433, including the host organization 410 when operating as a node, receives such transaction broadcasts. Broadcast messages are delivered on a best effort basis. Nodes validate transactions, add them to the block they are building, and then broadcast the completed block to other nodes. Blockchains use various time-stamping schemes, such as proof-of-work, to serialize changes. Alternate consensus may be utilized in conjunction with the various blockchain protocols offered by and supported by the host organization, with such consensus mechanisms including, for example proof-of-stake, proof-of-authority and proof-of-burn, to name a few.

Open blockchains are more user friendly than conventional traditional ownership records, which, while open to the public, still require physical access to view. Because most of the early blockchains were permissionless, there is some debate about the specific accepted definition of a so called "blockchain," such as, whether a private system with verifiers tasked and authorized (permissioned) by a central authority is considered a blockchain. The concept of permissioned verifiers is separate than the permissioned access control processes described herein. Proponents of permissioned or private chains argue that the term blockchain may be applied to any data structure that groups data into time-stamped blocks. These blockchains serve as a distributed version of multiversion concurrency control (MVCC) in databases. Just as MVCC prevents two transactions from concurrently modifying a single object in a database, blockchains prevent two transactions from spending the same single output in a blockchain. Regardless of the semantics or specific terminology applied to the varying types of blockchain technologies, the methodologies described herein with respect to a "blockchain" expand upon conventional blockchain protocol implementations to provide additional flexibility, open up new services and use cases for the described blockchain implementations, and depending upon the particular blockchain protocol offered or supported by the blockchain services interface 190 of the host organization 110, both private and public mechanisms are described herein and utilized as needed for different implementations supported by the host organization 110.

An advantage to an open, permissionless, or public, blockchain network is that guarding against bad actors is not required and no access control is generally needed, although as discussed herein, the embodiments provide for a blockchain access control for particular cases that are applicable to permissioned or public blockchains. This means that applications may be added to the network without the approval or trust of others, using the blockchain as a transport layer. Conversely, permissioned (e.g., private) blockchains use an access control layer to govern who has access to the network. The embodiments further provide access controls for entities within or external to a private or public blockchain. In contrast to public blockchain networks, validators on private blockchain networks are vetted, for example, by the network owner, or one or more members of a consortium. They rely on known nodes to validate transactions. Permissioned blockchains also go by the name of "consortium" or "hybrid" blockchains. Today, many corporations are using blockchain networks with private blockchains, or blockchain-based distributed ledgers, independent of a public blockchain system.

FIG. 5 is a diagram of another example architecture according to some example implementations. In this example architecture, the blockchain services interface 490 and the verification services 491 operate to support the verification systems further described in relation to FIGS. 1-3.

In this example, the host organization 410 which includes the hosted computing environment 411 having a processors and memory (e.g., within the execution hardware, software, and logic 420 of the database system 430) which serve to operate the blockchain services interface 490 including the blockchain consensus manager 491 and blockchain metadata definition manager 496. There is additionally depicted an index 516 which provides addressing capabilities for data, metadata, and records which are written to, or transacted onto the blockchain 599.

As shown, the index 516 is stored within the database system 430 of the host organization, however, the Merkle tree index 516 may alternatively be written to and stored on the blockchain itself, thus enabling participating nodes with the blockchain which lack access to the query interface 480 of the host organization to nevertheless be able to retrieve the Merkle tree index 516 (when stored on the blockchain) and then use an address retrieved from the Merkle tree index 516 to directly reference an addressable block on the blockchain to retrieve the desired record, data, or metadata, without having to traverse the entire blockchain or search the blockchain for the needed record.

As depicted, there is another index 516 depicted as being shown within the last standard block 442 of the blockchain 599. Only one index 516 is required, but the index 516 may permissibly be stored in either location.

The Merkle tree index 516 depicted in greater detail at the bottom shows a level 0 Merkle root having a hash of ABCDE, followed by a hash layer with two hash nodes, a first with hash ABC and a second with a hash DE, followed by the data blocks within the data leafs identified by hash A, B, C, D, and E, each containing the addressing information for the addressable blocks on the blockchain.

Storing data and metadata on the blockchain 599 in conjunction with the use of a Merkle tree index 516 is much more efficient than previously known data storage schemes as it is not necessary to search through multiple blocks 441 and 442 of the blockchain to retrieve a data record. Rather, the index 516 is first searched to retrieve an address for the desired block, which is very fast and efficient, and then using the retrieved address from the index 516, the record is retrieved directly from the addressable block on the blockchain 599.

As data is stored within a blockchain using conventional techniques, the amount of data in the blockchain explodes in terms of total volume of stored data creating scalability problems and resulting in problematic inefficiencies. The total volume of data stored to a blockchain tends to explode or grow unsustainably over time because every time a stored record is updated or modified, it is necessary to re-write the entirety of the modified record back to the blockchain which then becomes the most recent and up-to-date record, however, all prior versions and copies are retained within the blockchain, thus resulting in significant duplicative data entries being stored. The benefit to such an approach is that an entire record may be retrieved from a single block on the blockchain, without having to refer back to prior blocks on the blockchain for the same record. But such a storage scheme is highly inefficient in terms of storage.

Alternatively, only a modification to a record stored within the blockchain may be stored, in accordance with conventional approaches, thus resulting in the modified data being written into a new block on the blockchain, with the non-modifiable data being retrievable from a prior block of the blockchain. This approach reduces the total amount of data stored by the blockchain. Unfortunately, any data retrieval of a modified record requires the inspecting and retrieval from multiple blocks on the blockchain, thus mitigating the data redundancy and unsustainable growth problem, but trading that problem for an undesirable data retrieval inefficiency problem.

In such a way, data management for records and information stored within the blockchain 599 is improved. Moreover, metadata may additionally be stored within the blockchain to provide additional information and context regarding stored records, with each of the data records and the metadata describing such data records being more easily retrievable through the use of the index 516. Such metadata permits a business or other entity to transform the data record retrieved from the blockchain back into a useable format much easier than with conventional approaches which lose such context and metadata for any record written to the blockchain.

Figure 6:
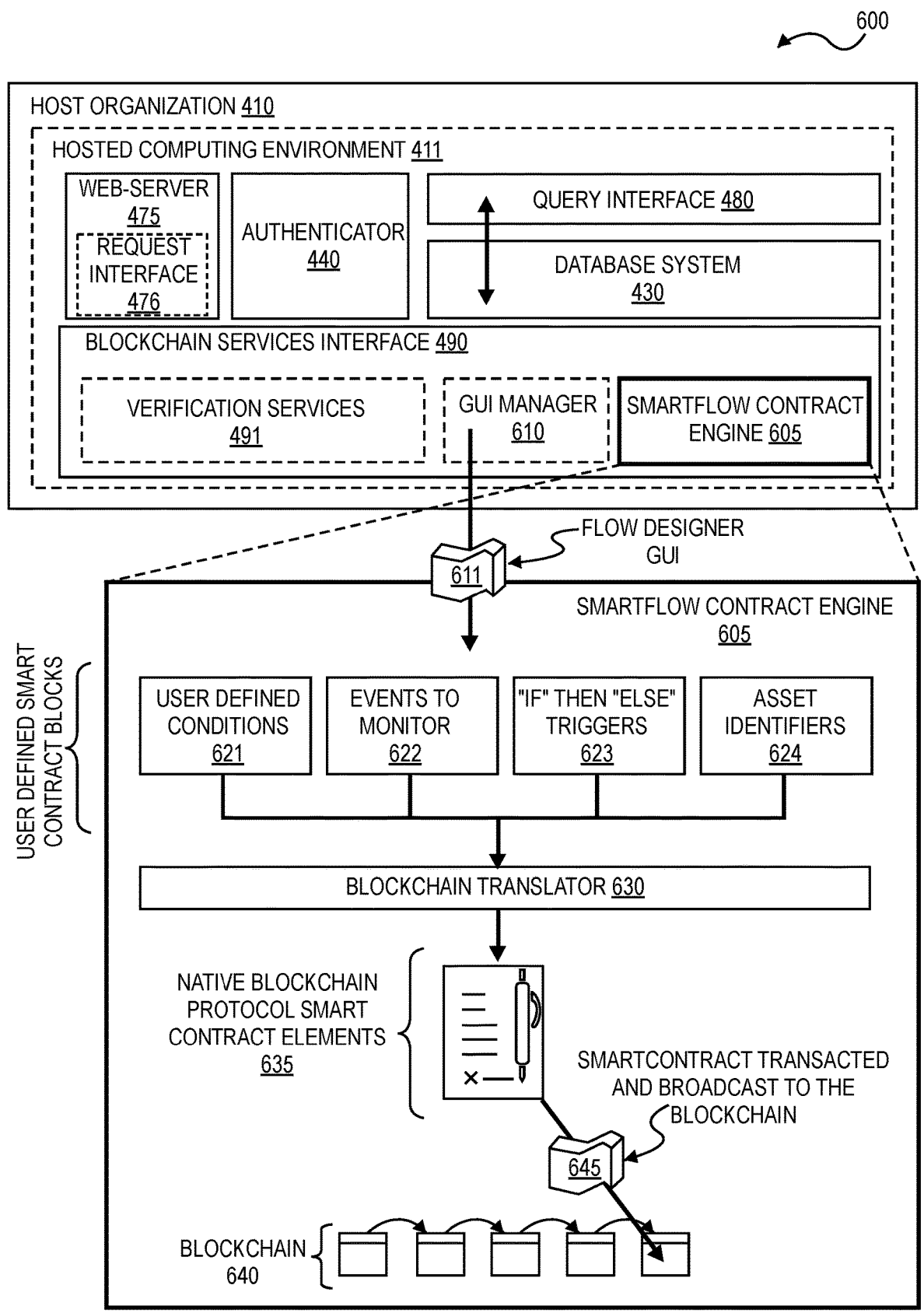
FIG. 6 is a diagram of another example architecture, with additional detail of a blockchain implemented smart contract created utilizing a smartflow contract engine, in accordance with some described embodiments.

FIG. 6 is a diagram of another example architecture, with additional detail of a blockchain implemented smart contract created utilizing a smartflow contract engine, in accordance with some described embodiments. In this example architecture, the verification services 491 operate to support the verification system described in relation to FIGS. 1-3 in conjunction with smart contracts to enforce aspects of the verification system.

In particular, there is depicted here within the host organization the blockchain services interface 490 which now includes the smartflow contract engine 605 and additionally includes the GUI manager 610.

Because blockchain utilizes a distributed ledger, creation and execution of smart contracts may be technically complex, especially for novice users. Consequently, a smart flow visual designer allows implementation of smart contracts with greater ease. The resulting smart flow contract has mathematically verifiable auto-generated code, as created by the blockchain translator 630 freeing customers and users from having to worry about the programming language used in any given blockchain protocol. Moreover, the smart flow contract engine implements visual designers that coordinate with the blockchain translator 630 to generate the requisite native code capable of executing on each of the participating nodes of the blockchain, thus further allowing easy processing and verification of the smart contract. According to certain embodiments, each smart flow contract utilizes a mathematical code based verifiable encryption scheme.

Flow designers provide users with a simple, intuitive, web-based interface for designing applications and customized process flows through a GUI based guided flow design experience. The flow designer enables even novice users to create otherwise complex functionality, without necessarily having coding expertise or familiarity with the blockchain.

The GUI manager 610 presents a flow designer GUI 611 interface to a user device via which users may interact with the host organization. The smartflow contract engine 605 in coordination with the GUI manager interprets the various rules, conditions, and operations provided by the user, to generate a smartflow contract which is then translated or written into the target blockchain protocol.

Through the flow designer GUI 611, a user may completely define utilizing visual flow elements how a particular process, event, agreement, contract, purchase, or some other transaction needs to occur, including dependencies, checks, required process inputs and outputs, triggers, etc.

Using the flow designer GUI 611, the user simply drags and drops operational blocks and defines various conditions and "if then else" events, such as if this event occurs, then take this action. As depicted here, there are a variety of user defined smart contract blocks including user defined conditions 621, events to monitor 621, "if" then "else" triggers 623, and asset identifiers 624.

Once the user has completed defining the flow including all of its operational blocks, conditions, triggers and events, the smartflow contract engine takes each of the individual blocks and translates them into a native target blockchain protocol via the blockchain translator 630, and then generates a transaction to write the translated smartflow contract 645 into the blockchain 640 via the blockchain services interface 490.

Once transacted to the blockchain, every participating node with the blockchain will have a copy of the smart contract, and therefore, if any given event occurs, the corresponding trigger or rule or condition will be viewable to all participating nodes, some of which may then take an action based on the event as defined by the smart contract.

The blockchain services interface 490 of the host organization provides customers, users, and subscribers access to different blockchains, some of which are managed by the host organization 410, such as private blockchains, others being public blockchains which are accessible through the host organization 410 which participates as a node on such public blockchains. Regardless, each blockchain utilizes a different blockchain protocol and has varying rules, configurations, and possibly different languages via which interfaces must use to communicate with the respective blockchains. Consequently, the blockchain translator 630 depicted here translates the user defined smart contract blocks into the native or required language and structure of the targeted blockchain 640 onto which the resulting smart contract is to be written or transacted.

Once the smart contract is transacted and broadcast to the blockchain 645 it is executed within the blockchain and its provisions, as set forth by the user defined smart contract blocks, are then carried out and enforced.

According to one implementation, a salesforce.com visual flow designer is utilized to generate the user defined smart contract blocks which are then translated into a blockchain smart contract. According to other embodiments, different visual flow designers are utilized and the blockchain translator 630 translates the user defined smart contract blocks into a blockchain smart contract.

The resulting native blockchain protocol smart contract elements 635 may be embodied within a code, structure, or language as dictated by the blockchain 640 onto which the smart contract is to be written. For instance, if the smart contract is to be written to Ethereum then the blockchain translator 430 must translate the user defined smart contract blocks into the Ethereum compliant "Solidity" programming language. Solidity is a contract-oriented, high-level language for implementing smart contracts specifically on Ethereum. Influenced by C++, Python and JavaScript, the language is designed to target the Ethereum Virtual Machine (EVM). Smart contract elements include support for voting, crowd funding, blind auctions, multi-signature wallets, as well as many other functions.

Conversely, if the smart contract is to be written to Hyperledger, then the language is different, utilizing the Go programming language which permits use of a distributed ledger blockchain for and smart contracts, among other capabilities.

While smart contracts are beneficial and supported by many blockchain protocols they may be cumbersome to implement to the requirement that they be programmed in differing languages depending on the particular blockchain being targeted. Therefore, not only must users understand programming constructs, but also the particular syntactical nuances of the required programming language for the blockchain protocol in question.

By utilizing the smart flow contract engine 605, even novice users may create compliant smart contracts by generating the smart contract elements with the flow designer and then leveraging the blockchain translator 630 to actually render the native blockchain programming language code embodying the smart contract elements as defined by the user, subsequent to which the blockchain services interface 490 handles the transacting of the smart contract onto the blockchain.

In some implementations, the verification requirements of the verification system can be implemented and enforced by use of smart contracts and the smart contract engine 605.

Figure 7:
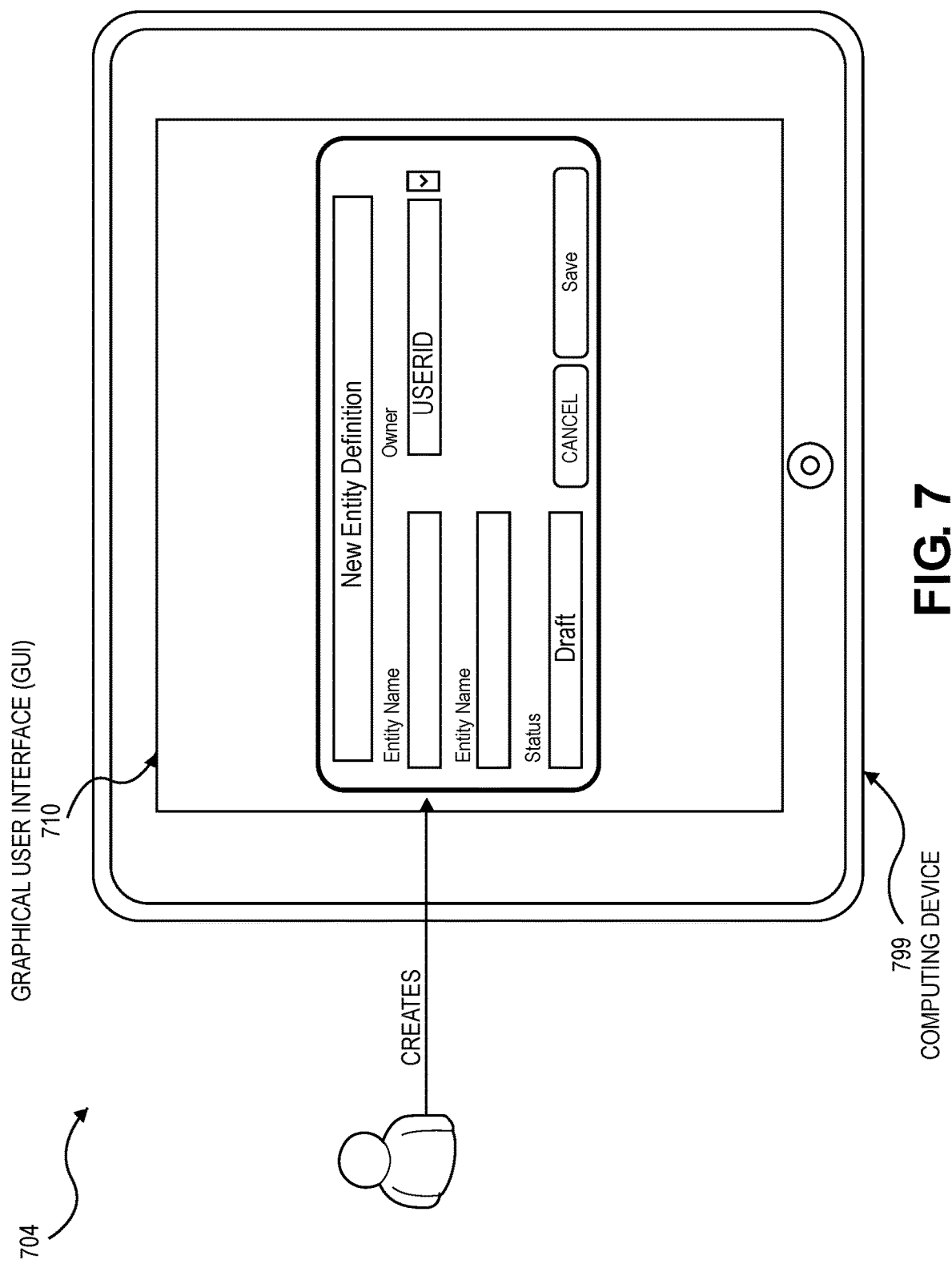
FIG. 7 is a diagram of an example interface and device according to some example implementations.

FIG. 7 is a diagram of an example interface and device according to some example implementations. A verification application provides a GUI 710 to input data and navigate the verification process. As shown here, there is a GUI 710 executing at a computing device 799, such as a trusted device in the verification system, with the GUI 710 being presented by the verification application or pushed to the computing device by the verification services of the host organization.

As shown here, the GUI 710 enables a user to start a creation of a new asset to be stored to the blockchain. As shown here, there is a "New Entity Definition" GUI presented, in which the user can create a new asset by entering suggested data to collect such as parts numbers, serial numbers, SKUs, owner information and similar information to be collected about the asset as described herein. Clicking save initiates the creation and sends the request to add to the blockchain via blockchain services of the host organization. The verification application can present similar interfaces for collecting additional data, capturing data from the device, capturing images, and similar data collection interfaces.

Figure 8:
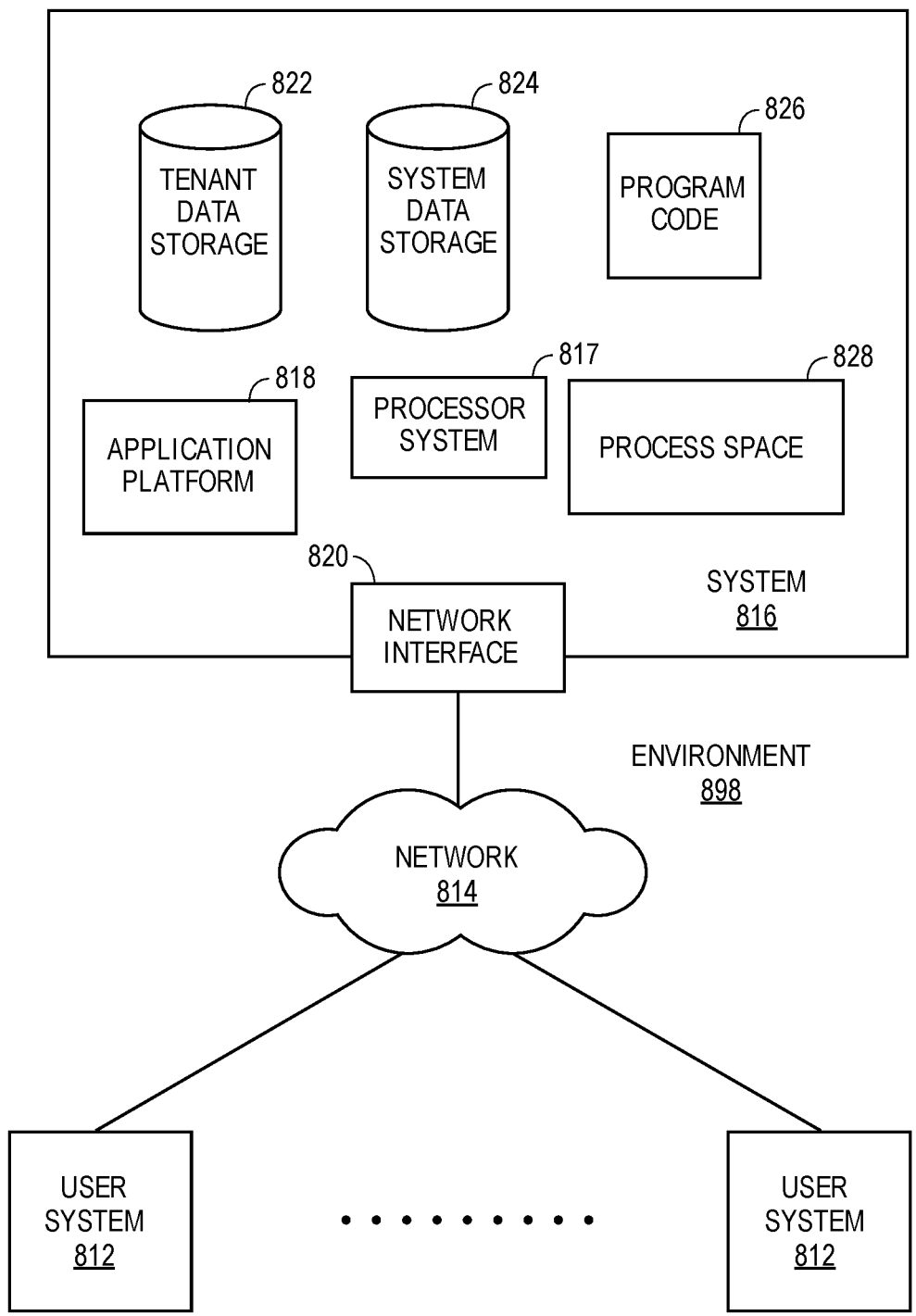
FIG. 8 is a block diagram of an environment in which an on-demand database service may operate in accordance with the described embodiments.

FIG. 8 is a block diagram of an environment in which an on-demand database service may operate in accordance with the described embodiments. Environment 898 may include user systems 812, network 814, system 816, processor system 817, application platform 818, network interface 820, tenant data storage 822, system data storage 824, program code 826, and process space 828. In other embodiments, environment 898 may not have all of the components listed and/or may have other elements instead of, or in addition to, those listed above.

Environment 898 is an environment in which an on-demand database service exists. User system 812 may be any machine or system that is used by a user to access a database user system. For example, any of user systems 812 may be a handheld computing device, a mobile phone, a laptop computer, a work station, and/or a network of computing devices. As illustrated in FIG. 8 (and in more detail in FIG. 9) user systems 812 might interact via a network 814 with an on-demand database service, which is system 816.

An on-demand database service, such as system 816, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 816" and "system 816" is used interchangeably herein. A database image may include one or more database objects. A relational database management system (RDMS) or the equivalent may execute storage and retrieval of information against the database object(s). Application platform 818 may be a framework that allows the applications of system 816 to run, such as the hardware and/or software, e.g., the operating system. In an embodiment, on-demand database service 816 may include an application platform 818 that enables creation, managing and executing one or more applications developed by the provider of the on-demand database service, users accessing the on-demand database service via user systems 812, or third party application developers accessing the on-demand database service via user systems 812.

The users of user systems 812 may differ in their respective capacities, and the capacity of a particular user system 812 might be entirely determined by permissions (permission levels) for the current user. For example, where a salesperson is using a particular user system 812 to interact with system 816, that user system has the capacities allotted to that salesperson. However, while an administrator is using that user system to interact with system 816, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 814 is any network or combination of networks of devices that communicate with one another. For example, network 814 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 812 might communicate with system 816 using TCP/IP and, at a higher network level, use other common Internet protocols to communicate, such as HTTP, FTP, AFS, WAP, etc. In an example where HTTP is used, user system 812 might include an HTTP client commonly referred to as a "browser" for sending and receiving HTTP messages to and from an HTTP server at system 816. Such an HTTP server might be implemented as the sole network interface between system 816 and network 814, but other techniques might be used as well or instead. In some implementations, the interface between system 816 and network 814 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 816, shown in FIG. 8, implements a verification system. For example, in one embodiment, system 1816 includes application servers configured to implement and execute verification services software applications as well as provide related data, code, forms, webpages and other information to and from user systems 812 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 816 implements applications other than, or in addition to, verification services. For example, system 816 may provide tenant access to multiple hosted (standard and custom) applications, including verification services application. User (or third party developer) applications, which may or may not include verification services, may be supported by the application platform 818, which manages creation, storage of the applications into one or more database objects and executing of the applications in a virtual machine in the process space of the system 816.

One arrangement for elements of system 816 is shown in FIG. 8, including a network interface 820, application platform 818, tenant data storage 822 for tenant data 823, system data storage 824 for system data 825 accessible to system 816 and possibly multiple tenants, program code 826 for implementing various functions of system 816, and a process space 828 for executing MTS system processes and tenant-specific processes, such as running applications as part of an application hosting service. Additional processes that may execute on system 816 include database indexing processes.

Several elements in the system shown in FIG. 8 include conventional, well-known elements that are explained only briefly here. For example, each user system 812 may include a desktop personal computer, workstation, laptop, PDA, cell phone, or any wireless access protocol (WAP) enabled device or any other computing device capable of interfacing directly or indirectly to the Internet or other network connection. User system 812 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 812 to access, process and view information, pages and applications available to it from system 816 over network 814. Each user system 812 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 816 or other systems or servers. For example, the user interface device may be used to access data and applications hosted by system 816, and to perform searches on stored data, and otherwise allows a user to interact with various GUI pages that may be presented to a user. As discussed above, embodiments are suitable for use with the Internet, which refers to a specific global internetwork of networks. However, it is understood that other networks may be used instead of the Internet, such as an intranet, an extranet, a virtual private network (VPN), a non-TCP/IP based network, any LAN or WAN or the like.

According to one embodiment, each user system 812 and all of its components are operator configurable using applications, such as a browser, including computer code run using a central processing unit such as an Intel Pentium® processor or the like. Similarly, system 816 (and additional instances of an MTS, where more than one is present) and all of their components might be operator configurable using application(s) including computer code to run using a central processing unit such as processor system 817, which may include an Intel Pentium® processor or the like, and/or multiple processor units.

According to one embodiment, each system 816 is configured to provide webpages, forms, applications, data and media content to user (client) systems 812 to support the access by user systems 812 as tenants of system 816. As such, system 816 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 9:
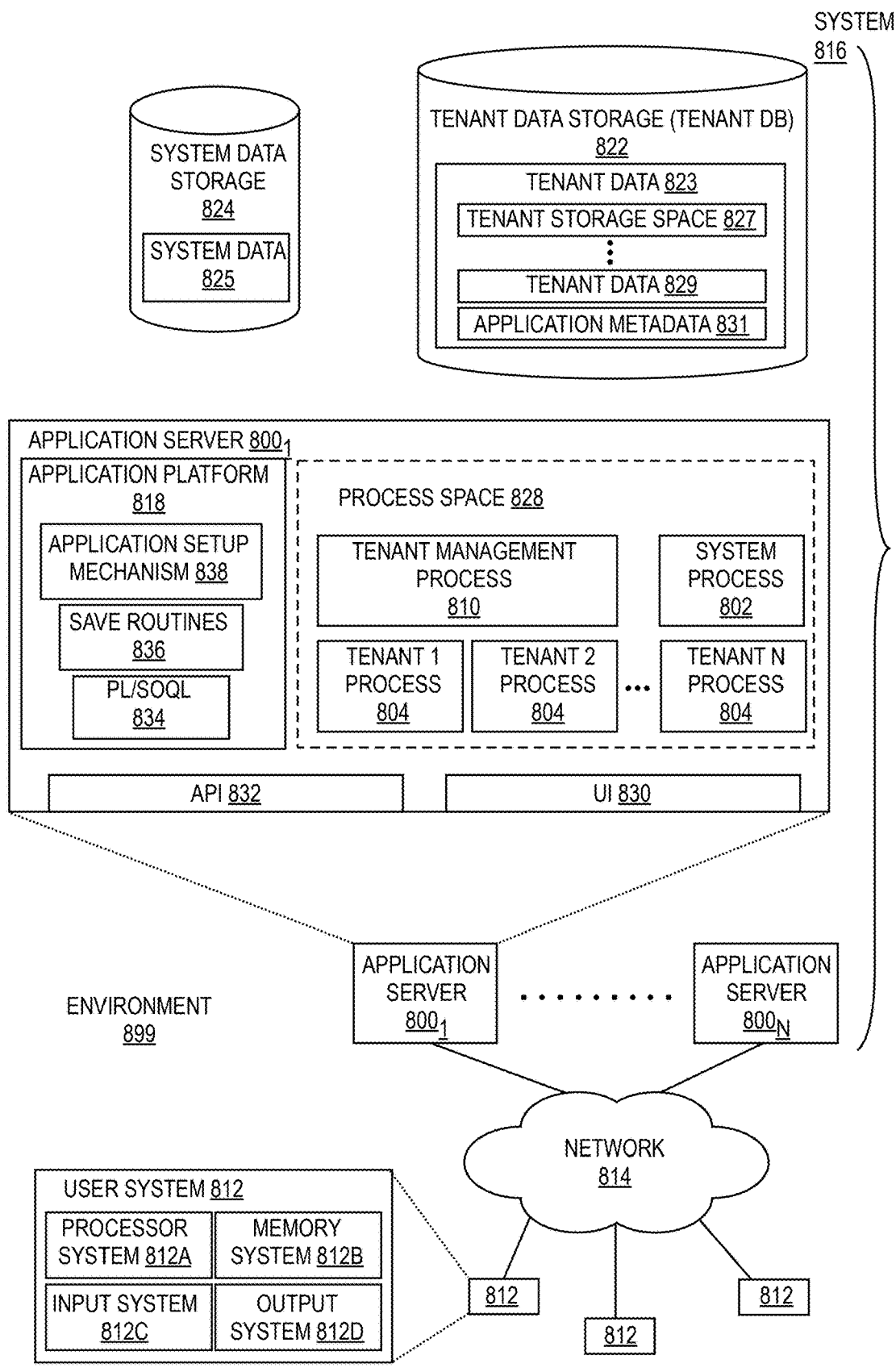
FIG. 9 is another block diagram of an environment in which an on-demand database service may operate in accordance with the described embodiments.

FIG. 9 is another block diagram of an environment in which an on-demand database service may operate in accordance with the described embodiments. User system 812 may include a processor system 812A, memory system 812B, input system 812C, and output system 812D. FIG. 9 shows network 814 and system 816. FIG. 9 also shows that system 816 may include tenant data storage 822, having therein tenant data 823, which includes, for example, tenant storage space 827, tenant data 829, and application metadata 831. System data storage 824 is depicted as having therein system data 825. Further depicted within the expanded detail of application servers $800_{1-N}$ are User Interface (UI) 830, Application Program Interface (API) 832, application platform 818 includes PL/SOQL 834, save routines 836, application setup mechanism 838, process space 828 includes system process space 802, tenant 1-N process spaces 804, and tenant management process space 810. In other embodiments, environment 899 may not have the same elements as those listed above and/or may have other elements instead of, or in addition to, those listed above.

User system 812, network 814, system 816, tenant data storage 822, and system data storage 824 were discussed above in FIG. 8. As shown by FIG. 9, system 816 may include a network interface 820 (of FIG. 8) implemented as a set of HTTP application servers 800, an application platform 818, tenant data storage 822, and system data storage 824. Also shown is system process space 802, including individual tenant process spaces 804 and a tenant management process space 810. Each application server 800 may be configured to tenant data storage 822 and the tenant data 823 therein, and system data storage 824 and the system data 825 therein to serve requests of user systems 812. The tenant data 823 might be divided into individual tenant storage areas (e.g., tenant storage space 827), which may be either a physical arrangement and/or a logical arrangement of data. Within each tenant storage space 827, tenant data 829, and application metadata 831 might be similarly allocated for each user. For example, a copy of a user's most recently used (MRU) items might be stored to tenant data 829. Similarly, a copy of MRU items for an entire organization that is a tenant might be stored to tenant storage space 827. A UI 830 provides a user interface and an API 832 provides an application programmer interface into system 816 resident processes to users and/or developers at user systems 812. The tenant data and the system data may be stored in various databases, such as one or more Oracle™ databases.

Application platform 818 includes an application setup mechanism 838 that supports application developers' creation and management of applications, which may be saved as metadata into tenant data storage 822 by save routines 836 for execution by subscribers as one or more tenant process spaces 804 managed by tenant management process space 810 for example. Invocations to such applications may be coded using PL/SOQL 834 that provides a programming language style interface extension to API 832. Invocations to applications may be detected by one or more system processes, which manages retrieving application metadata 831 for the subscriber making the invocation and executing the metadata as an application in a virtual machine.

Each application server 800 may be communicably coupled to database systems, e.g., having access to system data 825 and tenant data 823, via a different network connection. For example, one application server 800₁ might be coupled via the network 814 (e.g., the Internet), another application server 800N-1 might be coupled via a direct network link, and another application server 800N might be coupled by yet a different network connection. Transfer Control Protocol and Internet Protocol (TCP/IP) are typical protocols for communicating between application servers 800 and the database system. However, it will be apparent to one skilled in the art that other transport protocols may be used to optimize the system depending on the network interconnect used.

In certain embodiments, each application server 800 is configured to handle requests for any user associated with any organization that is a tenant. Because it is desirable to be able to add and remove application servers from the server pool at any time for any reason, there is preferably no server affinity for a user and/or organization to a specific application server 800. In one embodiment, therefore, an interface system implementing a load balancing function (e.g., an F5 Big-IP load balancer) is communicably coupled between the application servers 800 and the user systems 812 to distribute requests to the application servers 800. In one embodiment, the load balancer uses a least connections algorithm to route user requests to the application servers 800. Other examples of load balancing algorithms, such as round robin and observed response time, also may be used. For example, in certain embodiments, three consecutive requests from the same user may hit three different application servers 800, and three requests from different users may hit the same application server 800. In this manner, system 816 is multi-tenant, in which system 816 handles storage of, and access to, different objects, data and applications across disparate users and organizations.

As an example of storage, one tenant might be a company that employs a sales force where each salesperson uses system 816 to manage their sales process. Thus, a user might maintain contact data, leads data, customer follow-up data, performance data, goals and progress data, etc., all applicable to that user's personal sales process (e.g., in tenant data storage 822). In an example of a MTS arrangement, since all of the data and the applications to access, view, modify, report, transmit, calculate, etc., may be maintained and accessed by a user system having nothing more than network access, the user may manage his or her sales efforts and cycles from any of many different user systems. For example, if a salesperson is visiting a customer and the customer has Internet access in their lobby, the salesperson may obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 816 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 816 might also maintain system level data usable by multiple tenants or other data. Such system level data might include industry reports, news, postings, and the like that are sharable among tenants.

In certain embodiments, user systems 812 (which may be client systems) communicate with application servers 800 to request and update system-level and tenant-level data from system 816 that may require sending one or more queries to tenant data storage 822 and/or system data storage 824. System 816 (e.g., an application server 800 in system 816) automatically generates one or more SQL statements (e.g., one or more SQL queries) that are designed to access the desired information. System data storage 824 may generate query plans to access the requested data from the database.

Each database may generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 10:
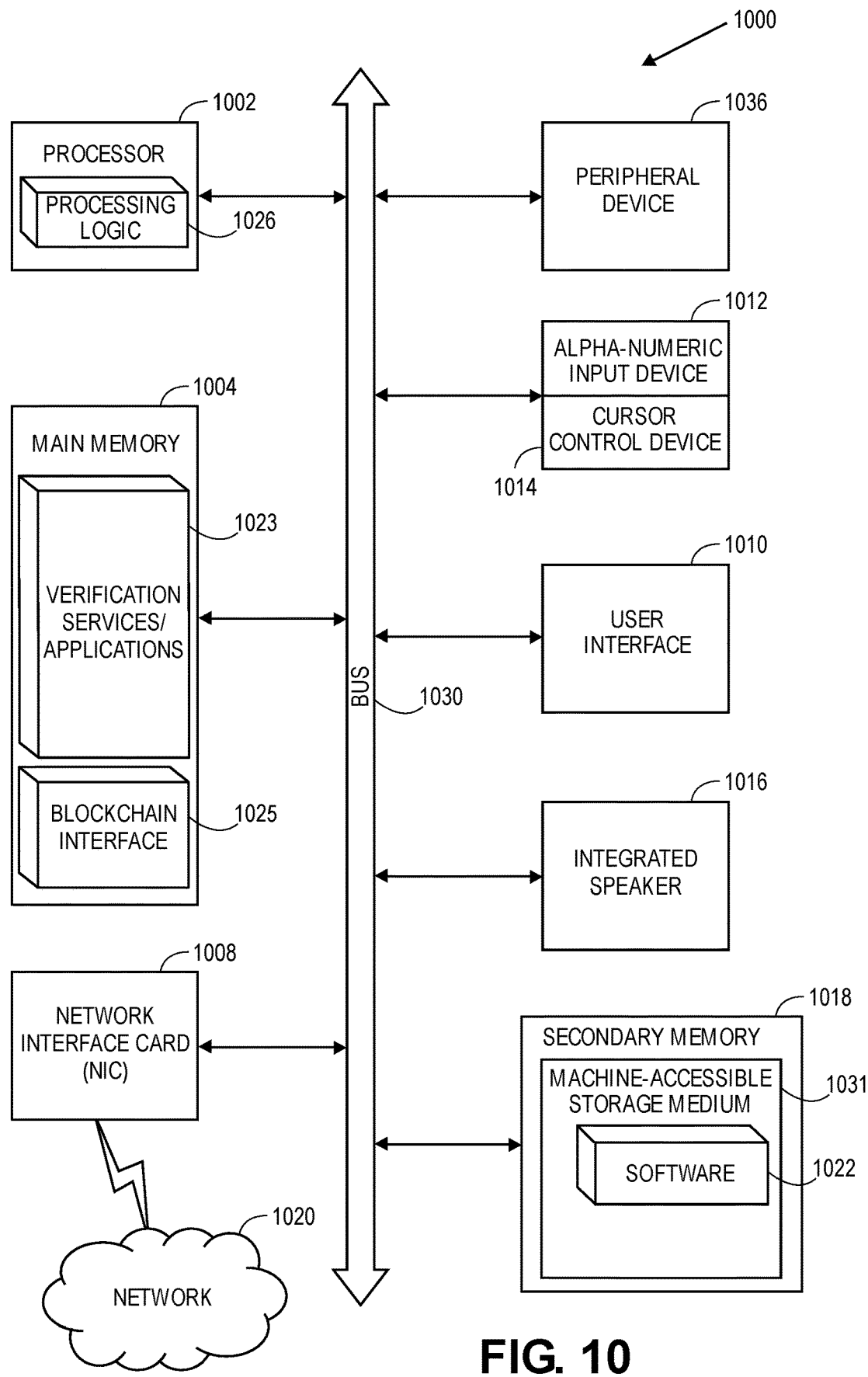
FIG. 10 is a diagram of a machine in the example form of a computer system, in accordance with some embodiments.

FIG. 10 is a diagram of a machine in the example form of a computer system, in accordance with some embodiments. Machine 1000 in the exemplary form of a computer system, in accordance with one embodiment, within which a set of instructions, for causing the machine/computer system 1000 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1000 includes a processor 1002, a main memory 1004 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 1018 (e.g., a persistent storage device including hard disk drives and a persistent database and/or a multi-tenant database implementation), which communicate with each other via a bus 1030. Main memory 1004 includes blockchain verification services or applications 1023. Other blockchain interface 1025 functions can also be stored in the main memory 1004. Main memory 1004 and its sub-elements are operable in conjunction with processing logic 1026 and processor 1002 to perform the methodologies discussed herein.

Processor 1002 represents one or more general-purpose processing devices such as a microprocessor, central processing unit, or the like. More particularly, the processor 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1002 may also be one or more special-purpose processing devices such as an application specific integrated circuit (ASIC), a field programmable gate array (FPGA), a digital signal processor (DSP), network processor, or the like. Processor 1002 is configured to execute the processing logic 1026 for performing the operations and functionality which is discussed herein.

The computer system 1000 may further include a network interface card 1008. The computer system 1000 also may include a user interface 1010 (such as a video display unit, a liquid crystal display, etc.), an alphanumeric input device 1012 (e.g., a keyboard), a cursor control device 1014 (e.g., a mouse), and a signal generation device 1016 (e.g., an integrated speaker). The computer system 1000 may further include peripheral device 1036 (e.g., wireless or wired communication devices, memory devices, storage devices, audio processing devices, video processing devices, etc.).

The secondary memory 1018 may include a non-transitory machine-readable storage medium or a non-transitory computer readable storage medium or a non-transitory machine-accessible storage medium 1031 on which is stored one or more sets of instructions (e.g., software 1022) embodying any one or more of the methodologies or functions described herein. The software 1022 may also reside, completely or at least partially, within the main memory 1004 and/or within the processor 1002 during execution thereof by the computer system 1000, the main memory 1004 and the processor 1002 also constituting machine-readable storage media. The software 1022 may further be transmitted or received over a network 1020 via the network interface card 1008.

The term "user" is a generic term referring to an entity (e.g., an individual person) using a system and/or service. A multi-tenant architecture provides each tenant with a dedicated share of a software instance and the ability (typically) to input tenant specific data for user management, tenant-specific functionality, configuration, customizations, non-functional properties, associated applications, etc. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

Exemplary Electronic Devices

Electronic Device and Machine-Readable Media

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 11A:
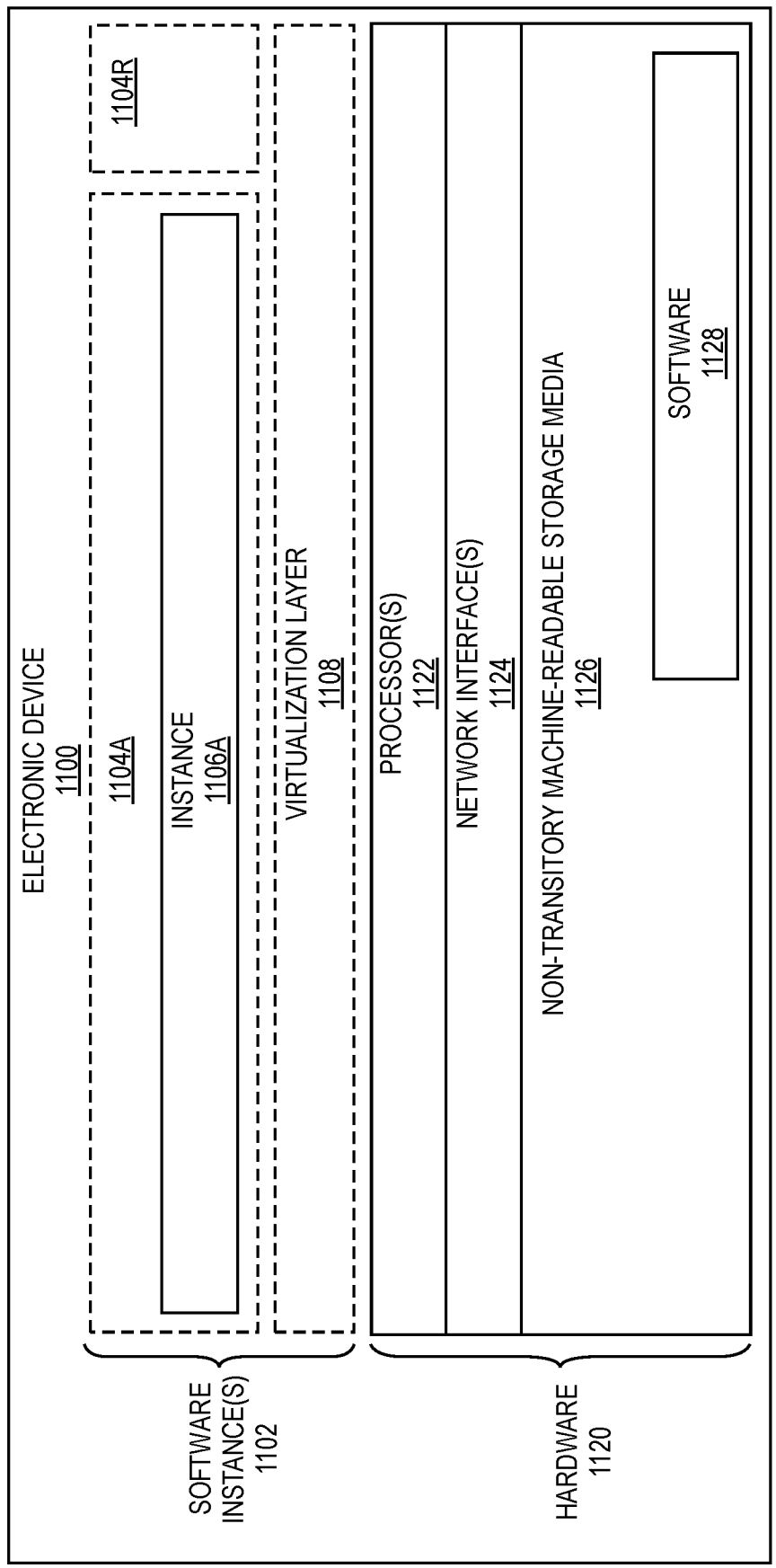
FIGS. 11A and 11B are example implementation architectures.

FIG. 11A is a block diagram illustrating an electronic device 1100 according to some example implementations. FIG. 11A includes hardware 1120 comprising a set of one or more processor(s) 1122, a set of one or more network interfaces 1124 (wireless and/or wired), and non-transitory machine-readable storage media 1126 having stored therein software 1128 (which includes instructions executable by the set of one or more processor(s) 1122). Each of the previously described end user clients and the verification service may be implemented in one or more electronic devices 1100. In one implementation: 1) each of the end user clients is implemented in a separate one of the electronic devices 1100 (e.g., in user electronic devices operated by users where the software 1128 represents the software to implement end user clients to interface with the XYZ service (e.g., a web browser, a native client, a portal, a command-line interface, and/or an application program interface (API) based upon protocols such as Simple Object Access Protocol (SOAP), Representational State Transfer (REST), etc.)); 2) the XYZ service is implemented in a separate set of one or more of the electronic devices 1100 (e.g., a set of one or more server electronic devices where the software 1128 represents the software to implement the XYZ service); and 3) in operation, the electronic devices implementing the end user clients and the XYZ service would be communicatively coupled (e.g., by a network) and would establish between them (or through one or more other layers) connections for submitting verification information to the verification services service and returning verification related information to the end user clients. Other configurations of electronic devices may be used in other implementations (e.g., an implementation in which the end user client and the XYZ service are implemented on a single electronic device 1100).

In electronic devices that use compute virtualization, the set of one or more processor(s) 1122 typically execute software to instantiate a virtualization layer 1108 and software container(s) 1104A-R (e.g., with operating system-level virtualization, the virtualization layer 1108 represents the kernel of an operating system (or a shim executing on a base operating system) that allows for the creation of multiple software containers 1104A-R (representing separate user space instances and also called virtualization engines, virtual private servers, or jails) that may each be used to execute a set of one or more applications; with full virtualization, the virtualization layer 1108 represents a hypervisor (sometimes referred to as a virtual machine monitor (VMM)) or a hypervisor executing on top of a host operating system, and the software containers 1104A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 1128 (illustrated as instance 1106A) is executed within the software container 1104A on the virtualization layer 1108. In electronic devices where compute virtualization is not used, the instance 1106A on top of a host operating system is executed on the "bare metal" electronic device 1100. The instantiation of the instance 1106A, as well as the virtualization layer 1108 and software containers 1104A-R if implemented, are collectively referred to as software instance(s) 1102.

Alternative implementations of an electronic device may have numerous variations from that described above. For example, customized hardware and/or accelerators might also be used in an electronic device.

Network Device

A network device (ND) is an electronic device that communicatively interconnects other electronic devices on the network (e.g., other network devices, user electronic devices, server electronic devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Exemplary Environment

Figure 11B:
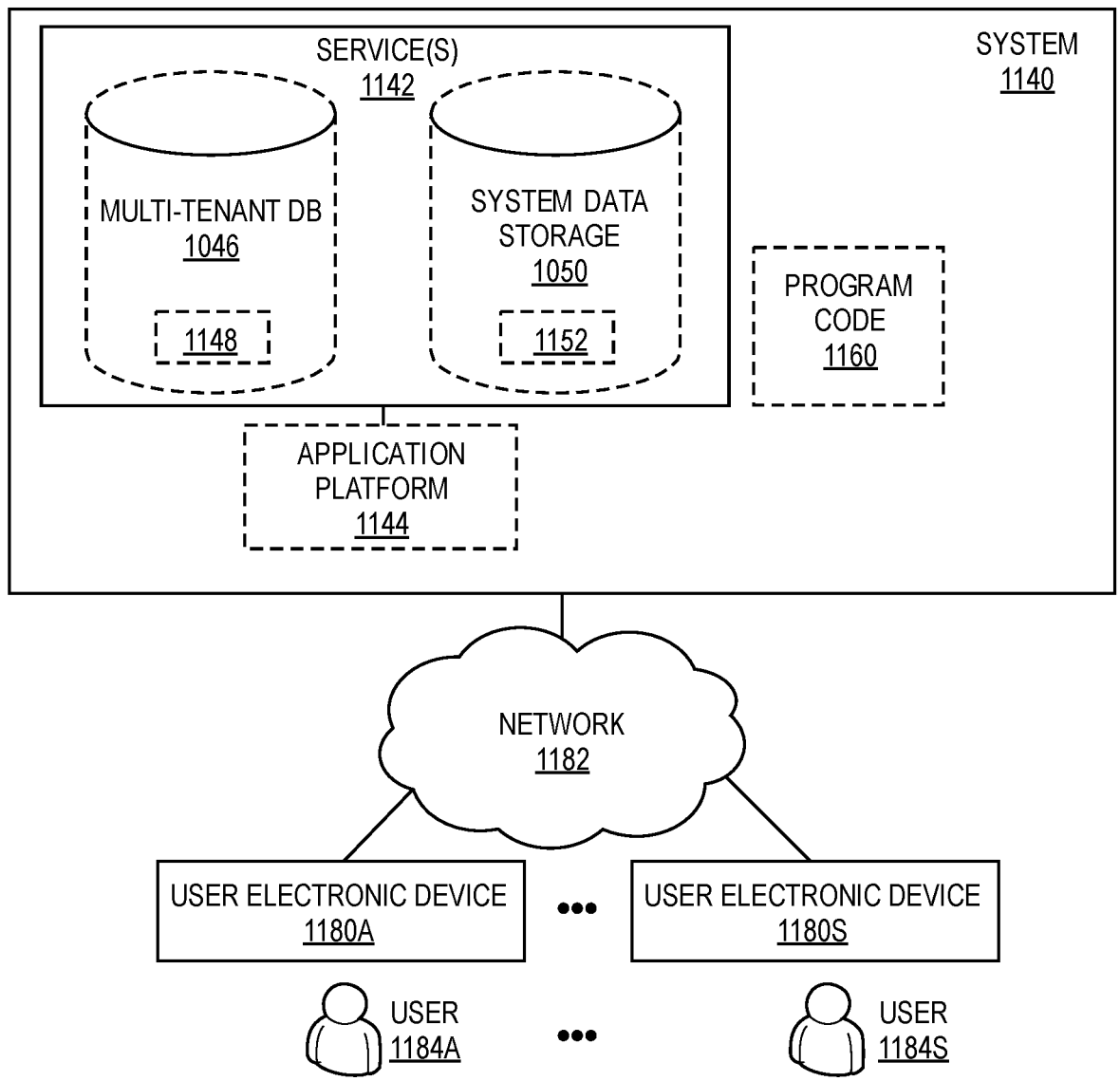

FIG. 11B is a block diagram of an environment where a verification application or verification service may be deployed, according to some implementations. A system 1140 includes hardware (a set of one or more electronic devices) and software to provide service(s) 1142, including the verification service. The system 1140 is coupled to user electronic devices 1180A-S over a network 1182. The service(s) 1142 may be on-demand services that are made available to one or more of the users 1184A-S working for one or more other organizations (sometimes referred to as outside users) so that those organizations do not need to necessarily be concerned with building and/or maintaining a system, but instead makes use of the service(s) 1142 when needed (e.g., on the demand of the users 1184A-S). The service(s) 1142 may communication with each other and/or with one or more of the user electronic devices 1180A-S via one or more Application Programming Interface(s) (APIs) (e.g., a Representational State Transfer (REST) API). The user electronic devices 1180A-S are operated by users 1184A-S.

In one implementation, the system 1140 is a multi-tenant cloud computing architecture supporting multiple services, such as a verification system and service, customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), and/or Infrastructure as a Service (IAAS) (e.g., virtual machines, servers, and/or storage). For example, system 1140 may include an application platform 1144 that enables PAAS for creating, managing, and executing one or more applications developed by the provider of the application platform 1144, users accessing the system 1140 via one or more of user electronic devices 1180A-S, or third-party application developers accessing the system 1140 via one or more of user electronic devices 1180A-S.

In some implementations, one or more of the service(s) 1142 may utilize one or more multi-tenant databases 1146 for tenant data 1148, as well as system data storage 1150 for system data 1152 accessible to system 1140. In certain implementations, the system 1140 includes a set of one or more servers that are running on server electronic devices and that are configured to handle requests for any authorized user associated with any tenant (there is no server affinity for a user and/or tenant to a specific server). The user electronic device 1180A-S communicate with the server(s) of system 1140 to request and update tenant-level data and system-level data hosted by system 1140, and in response the system 1140 (e.g., one or more servers in system 1140) automatically may generate one or more Structured Query Language (SQL) statements (e.g., one or more SQL queries) that are designed to access the desired information from the one or more multi-tenant database 1146 and/or system data storage 1150.

In some implementations, the service(s) 1142 are implemented using virtual applications dynamically created at run time responsive to queries from the user electronic devices 1180A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 1160 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 1144 includes an application setup mechanism that supports application developers' creation and management of applications, which may be saved as metadata by save routines. Invocations to such applications, including the XYZ service, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 1182 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 1140 and the user electronic devices 1180A-S.

Each user electronic device 1180A-S(such as a desktop personal computer, workstation, laptop, Personal Digital Assistant (PDA), smart phone, etc.) typically includes one or more user interface devices, such as a keyboard, a mouse, a trackball, a touch pad, a touch screen, a pen or the like, for interacting with a graphical user interface (GUI) provided on a display (e.g., a monitor screen, a liquid crystal display (LCD), etc.) in conjunction with pages, forms, applications and other information provided by system 1140. For example, the user interface device can be used to access data and applications hosted by system 1140, and to perform searches on stored data, and otherwise allow a user 1184 to interact with various GUI pages that may be presented to a user 1184. User electronic devices 1180A-S might communicate with system 1140 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 1180A-S might include an HTTP client, commonly referred to as a "browser," for sending and receiving HTTP messages to and from server(s) of system 1140, thus allowing users 1184 of the user electronic device 1180A-S to access, process and view information, pages and applications available to it from system 1140 over network 1182.

CONCLUSION

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method of asset verification implemented by a set of one or more computing devices, the asset verification utilizing identifying information associated with the asset, the method comprising:
   collecting, at a first computing device that is operating as a client device relative to a second computing device operating as a server, two or more of:
      first asset information about a physical asset from a user using the first computing device of the set of computing devices;
      second asset information from the first computing device; and
      transferor identification information from the user, wherein the transferor identification information identifies a transferor in a transfer of the physical asset;
   generating a first set of hashes, wherein the first set of hashes include two or more of a hash of the first asset information, a hash of the second asset information, or a hash of the transferor identification information;
   comparing the first set of hashes to a second set of hashes that is stored in a merkle trie tree stored in a blockchain accessed by the server, wherein the merkle trie tree was generated during a prior transaction involving the physical asset, wherein the second set of hashes was stored in the merkle trie tree in a format that enables partial matches; and
   verifying the physical asset at least in response to a partial match, wherein the partial match is based on a degree of match between the first set of hashes and the second set of hashes exceeding a threshold, wherein the verification of the physical asset verifies authenticity of the physical asset as compared to a counterfeit through two or more of the first asset information, the second asset information, or the transferor identification information.

2. The method of claim 1, further comprising:
   querying an installer or manufacturer or prior asset holder for additional verification information.

3. The method of claim 1, further comprising:
collecting transferee identification information from the user and storing transaction information in the blockchain in response to the verification of the physical asset.

4. The method of claim 1, wherein the first asset information from the user about the physical asset includes product stock keeping unit, serial number, physical characteristics, or asset description, wherein the second asset information from the first computing device includes a computing device identifier of the first computing device, time, date, temperature, location, or imaging information.

5. The method of claim 1, the method further comprising:
generating a first unique identifier based on a hash of the first asset information, a hash of the second asset information, and a hash of the transferor identification information; and
verifying the physical asset further in response to a match being determined between the first unique identifier and a second unique identifier in the blockchain, wherein the second unique identifier was generated during the prior transaction involving the physical asset.

6. An apparatus configured to execute an asset verification process, the apparatus comprising:
a set of one or more computing devices with respective non-transitory computer readable mediums having stored therein computer-executable instructions which when executed by the set of computing devices cause the apparatus to:
collect, at a first computing device that is operating as a client device relative to a second computing device operating as a server, two or more of first asset information about a physical asset from a user using the first computing device of the set of computing devices, second asset information from the first computing device, or transferor identification information from the user, wherein the transferor identification information identifies a transferor in a transfer of the physical asset,
generate a first set of hashes, wherein the first set of hashes include two or more of a hash of the first asset information, a hash of the second asset information, or a hash of the transferor identification information,
compare the first set of hashes to a second set of hashes that is stored in a merkle trie tree stored in a blockchain accessed by the server, wherein the merkle trie tree was generated during a prior transaction involving the physical asset, wherein the second set of hashes was stored in the merkle trie tree in a format that enables partial matches, and
verify the physical asset at least in response to a partial match, wherein the partial match is based on a degree of match between the first set of hashes and the second set of hashes exceeding a threshold, wherein the verification of the physical asset verifies authenticity of the physical asset as compared to a counterfeit through two or more of the first asset information, the second asset information, or the transferor identification information.

7. The apparatus of claim 6, wherein the apparatus is further caused to query an installer or manufacturer or prior asset holder for additional verification information.

8. The apparatus of claim 6, wherein the apparatus is further caused to collect transferee identification information from the user and store transaction information in the blockchain in response to the verification of the physical asset.

9. The apparatus of claim 6, wherein the first asset information about the physical asset from the user includes product stock keeping unit, serial number, physical characteristics, or asset description, and wherein the second asset information from the first computing device includes a computing device identifier of the first computing device, time, date, temperature, location, or imaging information.

10. A non-transitory machine-readable storage medium that provides instructions that, if executed by a set of one or more processors in one or more electronic devices, are configurable to cause the performance of operations, comprising:
collecting, at a first computing device that is operating as a client device relative to a second computing device operating as a server, two or more of:
first asset information about a physical asset from a user using the first computing device of the set of computing devices;
second asset information from the first computing device; and
transferor identification information from the user, wherein the transferor identification information identifies a transferor in a transfer of the physical asset;
generating a first set of hashes, wherein the first set of hashes include two or more of a hash of the first asset information, a hash of the second asset information, or a hash of the transferor identification information;
comparing the first set of hashes to a second set of hashes that is stored in a merkle trie tree stored in a blockchain accessed by the server, wherein the merkle trie tree was generated during a prior transaction involving the physical asset, wherein the second set of hashes was stored in the merkle trie tree in a format that enables partial matches; and
verifying the physical asset at least in response to a partial match, wherein the partial match is based on a degree of match between the first set of hashes and the second set of hashes exceeding a threshold, wherein the verification of the physical asset verifies authenticity of the physical asset as compared to a counterfeit through two or more of the first asset information, the second asset information, or the transferor identification information.

11. The non-transitory machine-readable storage medium of claim 10, the operations further comprising:
querying an installer or manufacturer or prior asset holder for additional verification information.

12. The non-transitory machine-readable storage medium of claim 10, the operations further comprising:
collecting transferee identification information from the user and storing transaction information in the blockchain in response to the verification of the physical asset.

13. The non-transitory machine-readable storage medium of claim 10, wherein the first asset information from the user about the physical asset includes product stock keeping unit, serial number, physical characteristics, or asset description, wherein the second asset information from the first computing device includes a computing device identifier of the first computing device, time, date, temperature, location, or imaging information.

14. The non-transitory machine-readable storage medium of claim 10, the operations further comprising:

generating a first unique identifier based on a hash of the first asset information, a hash of the second asset information, and a hash of the transferor identification information; and verifying the physical asset further in response to a match being determined between the first unique identifier and a second unique identifier in the blockchain, wherein the second unique identifier was generated during the prior transaction involving the physical asset.

\* \* \* \* \*